US011635550B2

(12) United States Patent
Takeuchi et al.

(10) Patent No.: US 11,635,550 B2
(45) Date of Patent: *Apr. 25, 2023

(54) LIGHTING DEVICE

(71) Applicant: SONY GROUP CORPORATION, Tokyo (JP)

(72) Inventors: Yuichiro Takeuchi, Tokyo (JP); Shunichi Suwa, Kanagawa (JP); Kunihiko Nagamine, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/446,004

(22) Filed: Aug. 26, 2021

(65) Prior Publication Data

US 2021/0389508 A1    Dec. 16, 2021

Related U.S. Application Data

(63) Continuation of application No. 15/742,706, filed as application No. PCT/JP2016/068622 on Jun. 23, 2016, now Pat. No. 11,125,919.

(30) Foreign Application Priority Data

Aug. 25, 2015 (JP) .................................. 2015-165380
Apr. 13, 2016 (JP) .................................. 2016-080455

(51) Int. Cl.
  *G02B 3/00* (2006.01)
  *F21V 5/04* (2006.01)
  (Continued)

(52) U.S. Cl.
  CPC ............. *G02B 3/0056* (2013.01); *F21V 5/04* (2013.01); *G02B 3/06* (2013.01); *G02B 30/27* (2020.01);
  (Continued)

(58) Field of Classification Search
  CPC ...... G02B 30/29; G02B 3/005; G02B 3/0056; G02B 3/06; G02B 3/0043; G02B 27/2214;
  (Continued)

(56) References Cited

U.S. PATENT DOCUMENTS 5,800,907 A   9/1998   Yumoto
5,930,037 A   7/1999   Imai
(Continued)

FOREIGN PATENT DOCUMENTS

CN    102906627 A    1/2013
EP      2572233 A2    3/2013
(Continued)

OTHER PUBLICATIONS

Decision to Grant for JP Patent Application No. 2017-536650, dated Oct. 27, 2020, 02 pages of Office Action and 02 pages of English Translation.

(Continued)

*Primary Examiner* — Jong-Suk (James) Lee
*Assistant Examiner* — Christopher E Dunay
(74) *Attorney, Agent, or Firm* — Chip Law Group

(57) ABSTRACT

Provided is a lighting device capable of manipulating a wider range of parameters to reproduce various light sources. A light source unit 10 includes, for example, a liquid crystal panel and a backlight, and each pixel is a light source capable of adjusting innumerable hues and intensities capable of adjusting hue and intensity. A lenticular lens 20 includes an array of a plurality of lenticules, and is arranged such that a plurality of light sources capable of adjusting hue and intensity is associated with each lenticule. In addition, on the outer periphery of the cylindrical portion of each (Continued)

lenticule, a partition is formed to block emission light from the pixel below the adjacent lenticule, thereby preventing repetition.

12 Claims, 36 Drawing Sheets

(51) Int. Cl.
| | |
|---|---|
| *G02B 30/27* | (2020.01) |
| *G02B 3/06* | (2006.01) |
| *G02F 1/13357* | (2006.01) |
| *F21S 11/00* | (2006.01) |
| *F21Y 115/10* | (2016.01) |
| *F21Y 115/20* | (2016.01) |
| *G02F 1/1335* | (2006.01) |

(52) U.S. Cl.
CPC .. *G02F 1/133603* (2013.01); *G02F 1/133606* (2013.01); *F21S 11/00* (2013.01); *F21Y 2115/10* (2016.08); *F21Y 2115/20* (2016.08); *G02B 3/0075* (2013.01); *G02B 2207/123* (2013.01); *G02F 1/133607* (2021.01)

(58) Field of Classification Search
CPC .. F21V 21/084; F21V 21/0965; F21V 17/105; F21V 5/004; F21V 21/096
USPC ........................................................ 600/249
See application file for complete search history.

(56) References Cited

U.S. PATENT DOCUMENTS

| | | | |
|---|---|---|---|
| 6,082,885 A | 7/2000 | Belfer | |
| 6,528,954 B1 | 3/2003 | Lys et al. | |
| 7,082,236 B1 | 7/2006 | Moore | |
| 7,671,935 B2* | 3/2010 | Mather | H04N 13/31 362/617 |
| 8,177,408 B1 | 5/2012 | Coleman | |
| 8,203,790 B2 | 6/2012 | Booyens et al. | |
| 8,279,079 B2 | 10/2012 | Bergman et al. | |
| 2003/0024142 A1* | 2/2003 | Killian | G03B 25/02 40/454 |
| 2005/0046799 A1* | 3/2005 | Pezzaniti | G02B 30/27 348/E13.029 |
| 2007/0058260 A1* | 3/2007 | Steenblik | G02B 30/27 359/626 |
| 2008/0186574 A1* | 8/2008 | Robinson | G02B 27/58 359/463 |
| 2009/0262280 A1 | 10/2009 | Kwon | |
| 2011/0096071 A1 | 4/2011 | Okamoto et al. | |
| 2011/0267823 A1 | 11/2011 | Angelini et al. | |
| 2012/0002120 A1 | 1/2012 | Ijzerman et al. | |
| 2012/0008070 A1* | 1/2012 | Takemoto | G02B 3/005 349/96 |
| 2013/0057159 A1 | 3/2013 | Pijlman et al. | |
| 2014/0085865 A1* | 3/2014 | Yun | G02B 3/0043 359/619 |
| 2014/0147087 A1 | 5/2014 | Lambert et al. | |
| 2015/0092030 A1* | 4/2015 | Lee | G02B 30/29 359/464 |
| 2015/0160614 A1* | 6/2015 | Sung | G02B 30/27 359/9 |
| 2016/0018662 A1* | 1/2016 | Wang | G02B 3/12 359/620 |

FOREIGN PATENT DOCUMENTS

| | | |
|---|---|---|
| JP | 2008-304715 A | 12/2008 |
| JP | 2009-075461 A | 4/2009 |
| JP | 2012-015080 A | 1/2012 |
| JP | 2013-015227 A | 1/2013 |
| JP | 2013-533501 A | 8/2013 |
| KR | 10-2009-0031175 A | 3/2009 |
| KR | 10-2013-0080017 A | 7/2013 |
| RU | 2012155589 A | 6/2014 |
| TW | 201207433 A | 2/2012 |
| WO | 2011/145031 A2 | 11/2011 |

OTHER PUBLICATIONS

International Search Report and Written Opinion of PCT Application No. PCT/JP2016/068622, dated Sep. 20, 2016, 10 pages of English Translation and 08 pages of ISRWO.
Notice of Allowance for U.S. Appl. No. 15/742,706, dated May 27, 2021, 9 pages.
Non-Final Office Action for U.S. Appl. No. 15/742,706, dated Mar. 6, 2020, 10 pages.
Final Office Action for U.S. Appl. No. 15/742,706, dated Oct. 2, 2019, 10 pages.
Advisory Action for U.S. Appl. No. 15/742,706, dated Jan. 9, 2020, 3 pages.
Advisory Action for U.S. Appl. No. 15/742,706, dated Dec. 1, 2020, 3 pages.
International Preliminary Report on Patentability of PCT Application No. PCT/JP2016/068622, dated Mar. 8, 2018, 09 pages of English Translation and 06 pages of IPRP.
Non-Final Office Action for U.S. Appl. No. 15/742,706, dated Jan. 28, 2021, 11 pages.
Final Office Action for U.S. Appl. No. 15/742,706, dated Sep. 18, 2020, 10 pages.

\* cited by examiner

LENTICULAR LENS 21

FIG. 6
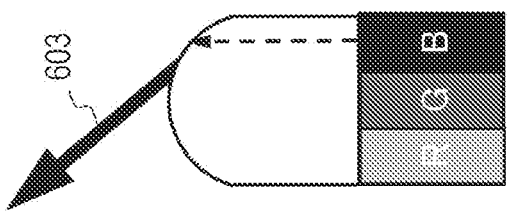
(C)
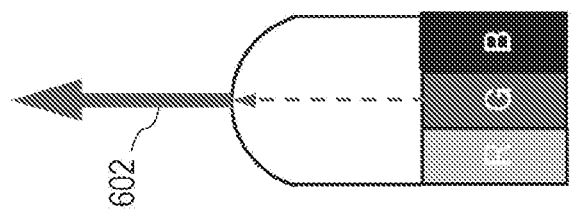
(B)
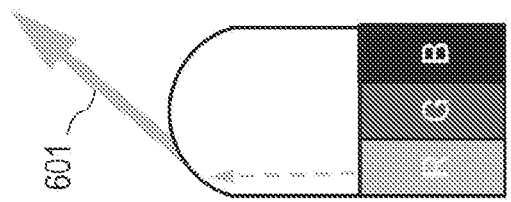
(A)

FIG. 15
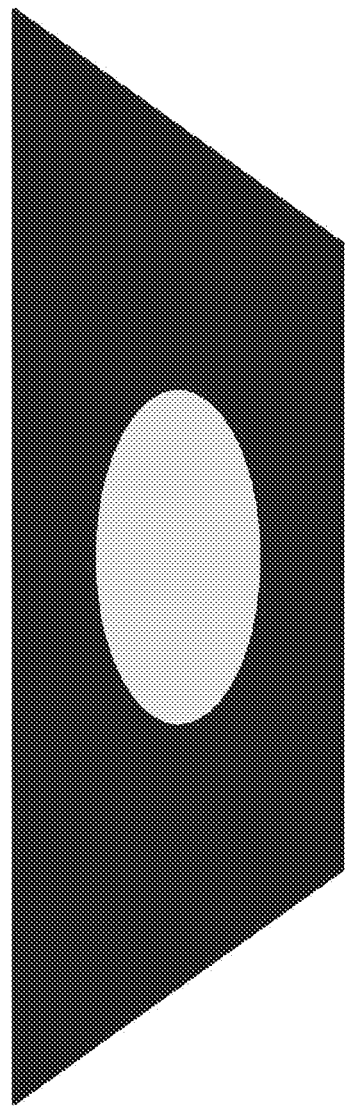
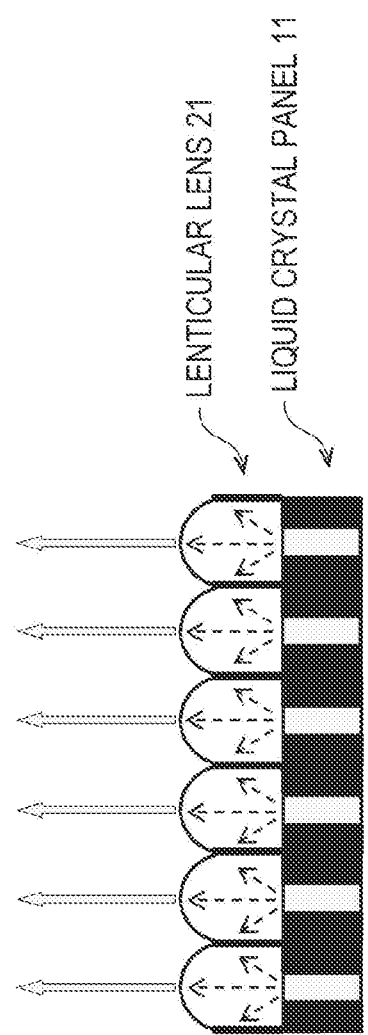

FIG. 18
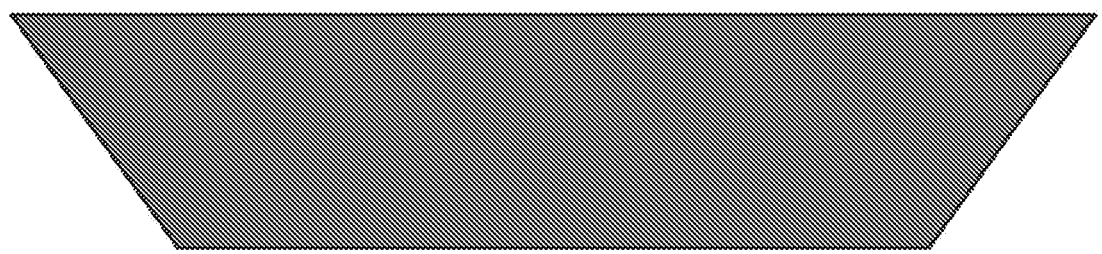
FIG. 19
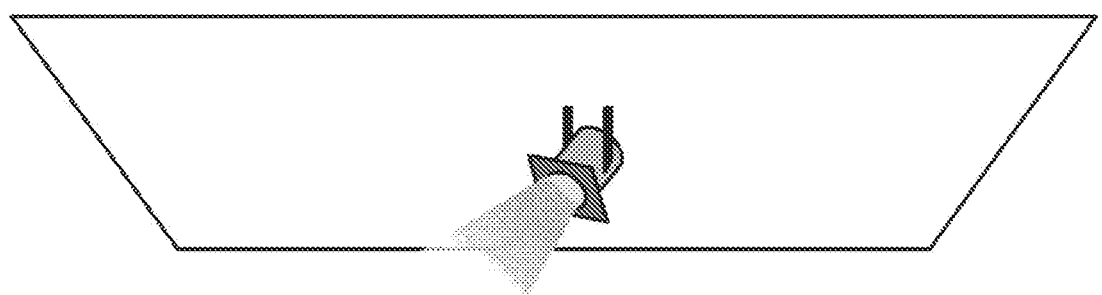

FIG. 22
FIG. 23
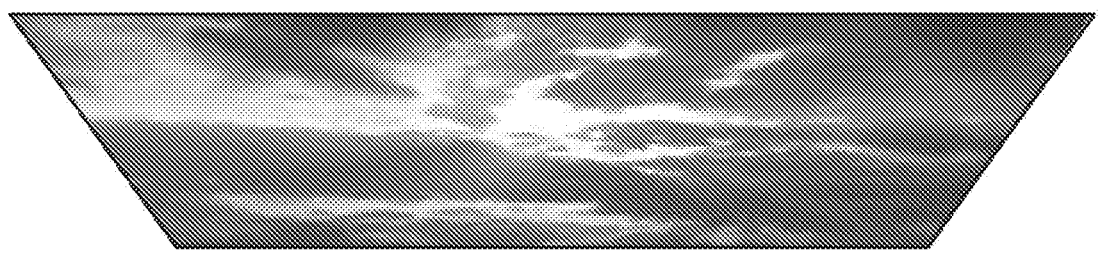

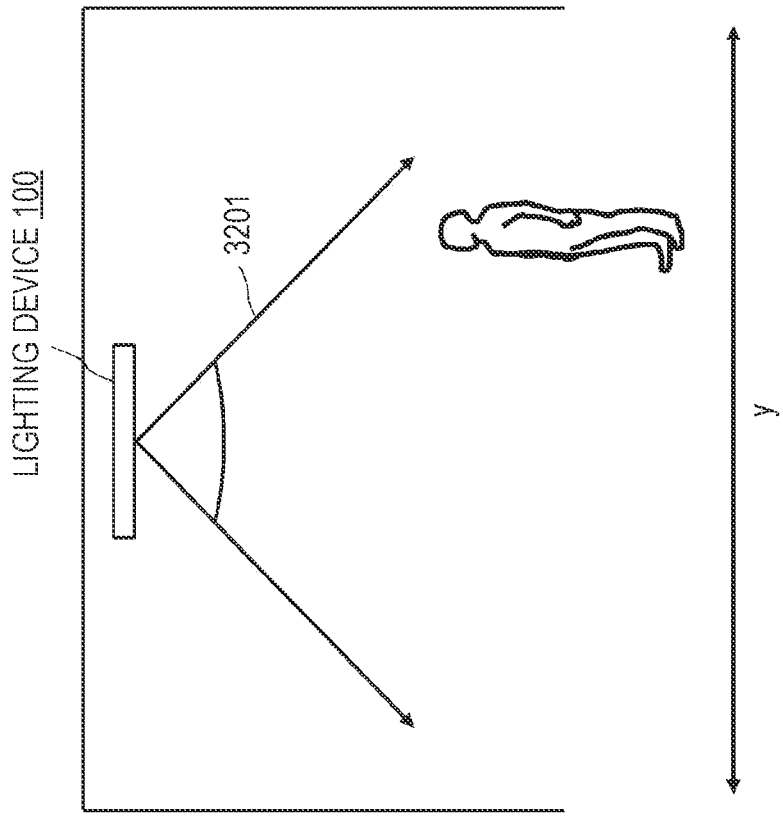
FIG. 32
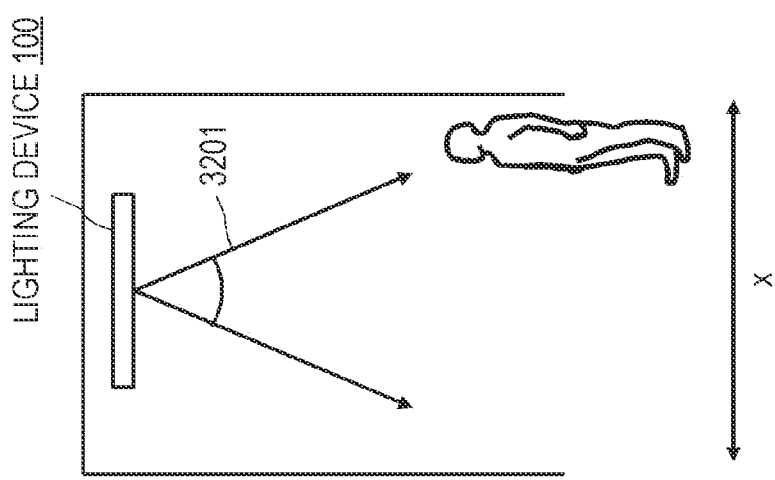

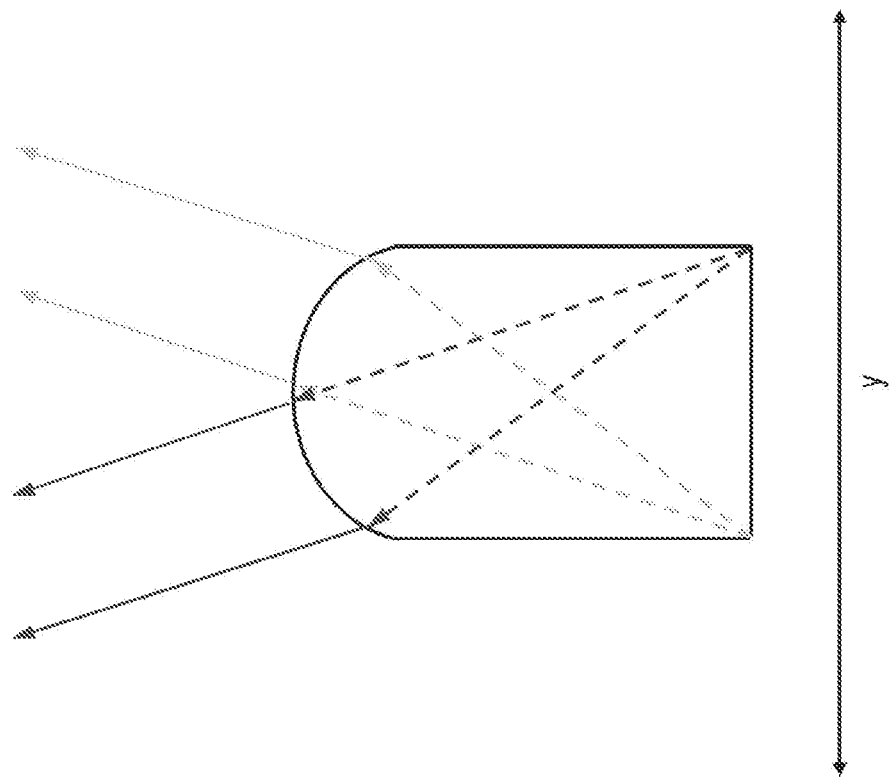
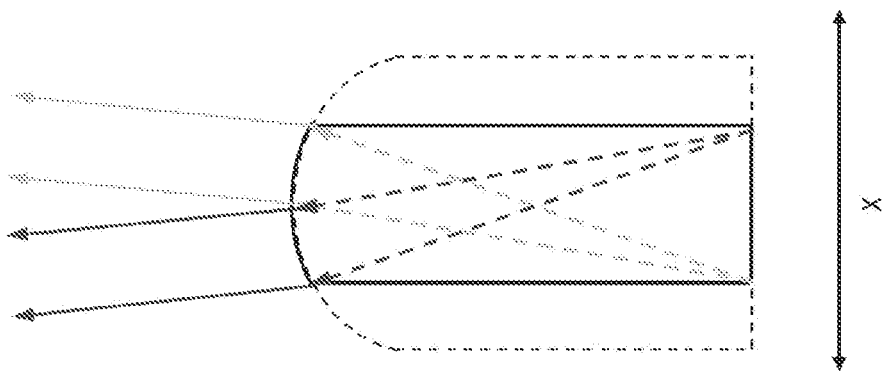
FIG. 34

LENTICULAR LENS 21

LIGHTING DEVICE

CROSS REFERENCE TO RELATED APPLICATIONS

This application is a continuation application of U.S. patent application Ser. No. 15/742,706, filed on Jan. 8, 2018, which is a U.S. National Phase of International Patent Application No. PCT/JP2016/068622 filed on Jun. 23, 2016, which claims priority benefit of Japanese Patent Application No. JP 2015-165380 filed in the Japan Patent Office on Aug. 25, 2015, and also claims priority benefit of Japanese Patent Application No. JP 2016-080455 filed in the Japan Patent Office on Apr. 13, 2016. Each of the above-referenced applications is hereby incorporated herein by reference in its entirety.

TECHNICAL FIELD

The technology disclosed in the present description relates to a lighting device that reproduces various light sources.

BACKGROUND ART

Lighting is widely used for the purpose of obtaining a good visual environment in dark places such as nighttime. For example, lighting fixtures such as incandescent light bulbs, fluorescent lights, and light emitting diodes (LEDs) are available and widely used as major home appliances.

In addition, it is well known that the quality of lighting affects the mental state, work efficiency, and the like of a person. Lighting is often used for the purpose of changing the image of space. Lighting technology is also applied to light therapy (phototherapy) and the like for treating depression. Of course, freely-optimized illumination light is comfortable and attractive for people who are not particularly afflicted with disease. It is expected that the demand for programmable lighting devices will rapidly increase with the decline in product prices in the future.

For example, there has been proposed a control device that controls the hue of radiation light from an LED light source (refer to, for example, Patent Document 1). In addition, hue provided by Philips is a wireless light bulb system that can reproduce more than 16 million colors by being operated via the Internet using information terminals such as smartphones and tablets.

As described above, lighting devices capable of adjusting the color tone and intensity of light using an LED bulb or the like are already known. However, in addition to the color tone and intensity, there are various other parameters that actually determine the quality of light, such as the positions and number of light sources and how the light spreads. In order to optimize light freely and reproduce various light sources, it is considered that a lighting device capable of manipulating a wider range of parameters is necessary.

CITATION LIST

Patent Document

Patent Document 1: U.S. Pat. No. 8,279,079

SUMMARY OF THE INVENTION

Problems to be Solved by the Invention

An object of the technology disclosed in the present description is to provide an excellent lighting device capable of manipulating not only hue and intensity but also a wider range of parameters to reproduce various light sources.

Solutions to Problems

The technology disclosed in the present description is made in consideration of the above-mentioned problem, and a first aspect thereof is a lighting device including: a light source unit including a two-dimensional array of light sources capable of adjusting hue and intensity; and a light ray control unit configured to control a radiation direction of the light source capable of adjusting hue and intensity.

According to a second aspect of the technology disclosed in the present description, the light ray control unit of the lighting device according to the first aspect includes a lenticular lens arranged such that a plurality of the light sources capable of adjusting hue and intensity is associated with each lenticule.

According to a third aspect of the technology disclosed in the present description, the lenticular lens of the lighting device according to the second aspect has a radiation direction inclined from a front direction.

According to a fourth aspect of the technology disclosed in the present description, the lenticular lens of the lighting device according to the second aspect has different emission angles for respective directions.

According to a fifth aspect of the technology disclosed in the present description, the light source unit of the lighting device according to the second aspect includes a liquid crystal panel and a light source configured to irradiate the liquid crystal panel from behind.

According to a sixth aspect of the technology disclosed in the present description, the light source unit of the lighting device according to the fifth aspect further includes a louver configured to limit an incident angle of incident light on the lenticular lens to a predetermined value or less.

According to a seventh aspect of the technology disclosed in the present description, the light source unit of the lighting device according to the first aspect includes a light emitting diode element. Alternatively, according to an eighth aspect of the technology disclosed in the present description, the light source unit of the lighting device according to the first aspect includes an organic EL element.

According to a ninth aspect of the technology disclosed in the present description, each lenticule of the lenticular lens of the lighting device according to the second aspect includes an opaque portion on a side surface.

According to a tenth aspect of the technology disclosed in the present description, the opaque portion of the lighting device according to the ninth aspect is configured to block light from the light source capable of adjusting hue and intensity associated with an adjacent lenticule.

According to an eleventh aspect of the technology disclosed in the present description, lenticules of the lenticular lens of the lighting device according to the first aspect are arranged apart from one another.

According to a twelfth aspect of the technology disclosed in the present description, the lighting device according to the first aspect further includes a control unit configured to control driving of the light source unit.

In addition, a thirteenth aspect of the technology disclosed in the present description is a lenticular lens including lenticules with opaque portions formed on respective side surfaces.

Effects of the Invention

According to the technology disclosed in the present description, it is possible to provide an excellent device capable of manipulating not only hue and intensity but also a wider range of parameters to reproduce various light sources.

Note that the effects described in the present description are only examples, and the effects of the present invention are not limited to these effects. Moreover, the present invention may provide further additional effects in addition to the above-mentioned effects.

Still another object, characteristic, and advantage of the technology disclosed in the present description will be clarified by the embodiment described later and a more detailed description based on the accompanying drawings.

BRIEF DESCRIPTION OF DRAWINGS

FIG. 6 is a diagram illustrating the directions of light rays emitted from one lenticule.

FIG. 15 is a diagram illustrating how light like a spotlight is reproduced by the lighting device with the improved lenticular lens.

FIG. 18 is a diagram illustrating an example in which a light source (with a different color) is reproduced by the lighting device 100.

FIG. 19 is a diagram illustrating an example in which a light source (one spotlight) is reproduced by the lighting device 100.

FIG. 22 is a diagram illustrating an example in which natural light (light filtering through trees) is reproduced by the lighting device 100.

FIG. 23 is a diagram illustrating an example in which natural light (twilight rays) is reproduced by the lighting device 100.

FIG. 32 is a diagram for explaining the radiation angle of light from the lenticular lens.

FIG. 34 is a diagram for explaining the radiation angle of light from the lenticular lens.

MODE FOR CARRYING OUT THE INVENTION

Hereinafter, an embodiment of the technology disclosed in the present description will be described in detail with reference to the drawings.

A. Device Configuration

Figure 1:
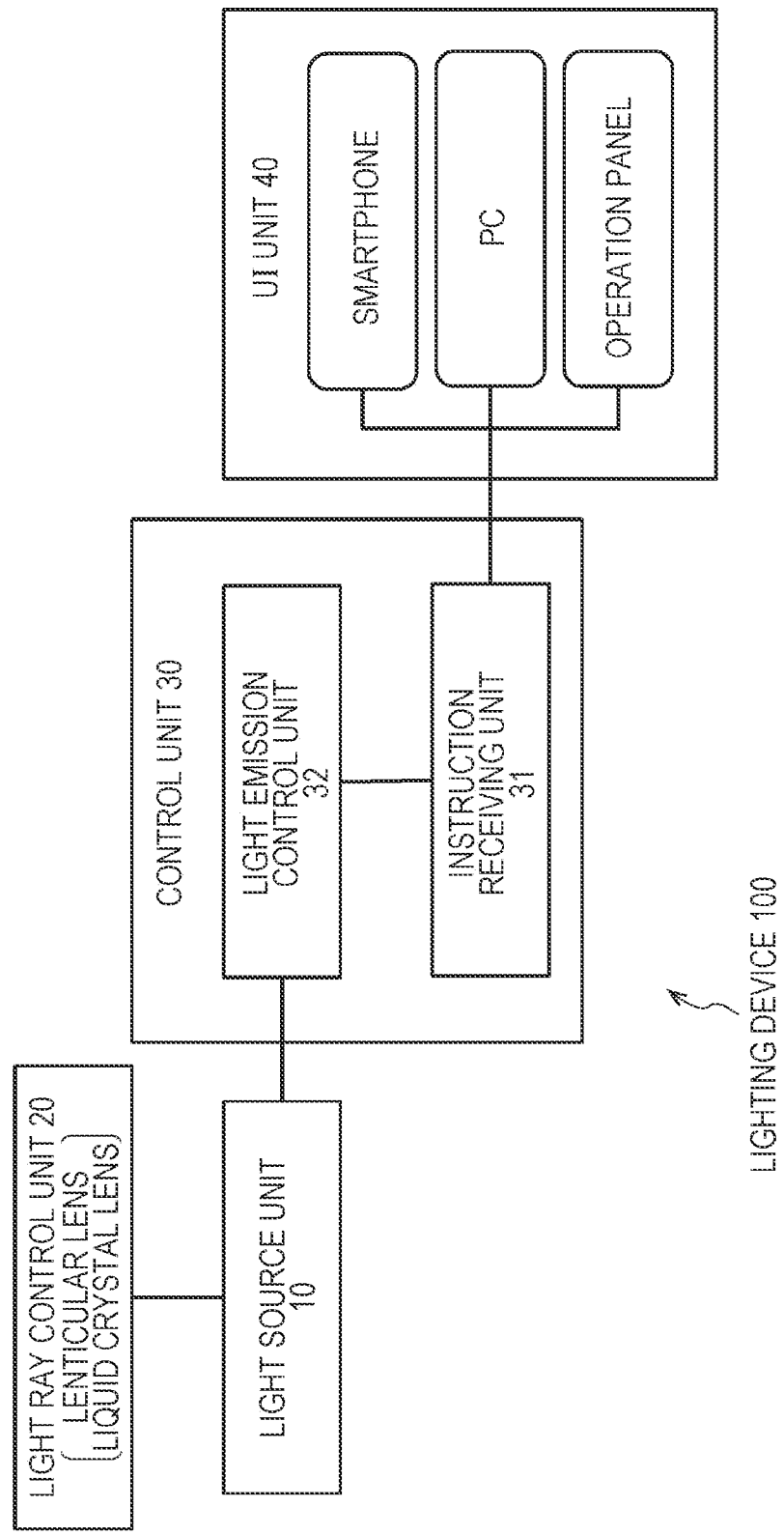
FIG. 1 is a diagram schematically illustrating an exemplary configuration of a lighting device 100 to which the technology disclosed in the present description is applied.

FIG. 1 is a diagram schematically illustrating an exemplary configuration of a lighting device 100 to which the technology disclosed in the present description is applied. The illustrated lighting device 100 includes a light source unit 10, a light ray control unit 20 superimposed on a radiation surface of the light source unit 10, a control unit 30 that controls driving of the light source unit 10, and a user interface (UI) unit 40 that is operated by a user.

The light source unit 10 includes a two-dimensional array of light sources capable of adjusting innumerable hues and intensities capable of adjusting hue and intensity. Further, the light ray control unit 20 controls the distribution of light emitted from the light source unit 10.

The light source control unit 20 includes, for example, a lenticular lens including an array of a plurality of lenticules (magnifying lenses). In the present embodiment, one lenticule is a microlens with a convex (spherical or aspherical) lens formed on one end face of a cylinder. In addition, each lenticule is arranged such that a plurality of light sources capable of adjusting hue and intensity is associated with each lenticule so as to control the direction of radiation light. Therefore, by combining the light source unit 10 and the lenticular lens, it is possible to adjust various other parameters such as the positions and number of light sources and how the light spreads. Alternatively, the light ray control unit 20 may include a liquid crystal lens. In this case, the distribution of light can be switched dynamically by changing the apparent refractive index of the liquid crystal by adjusting the applied voltage.

Figure 2:
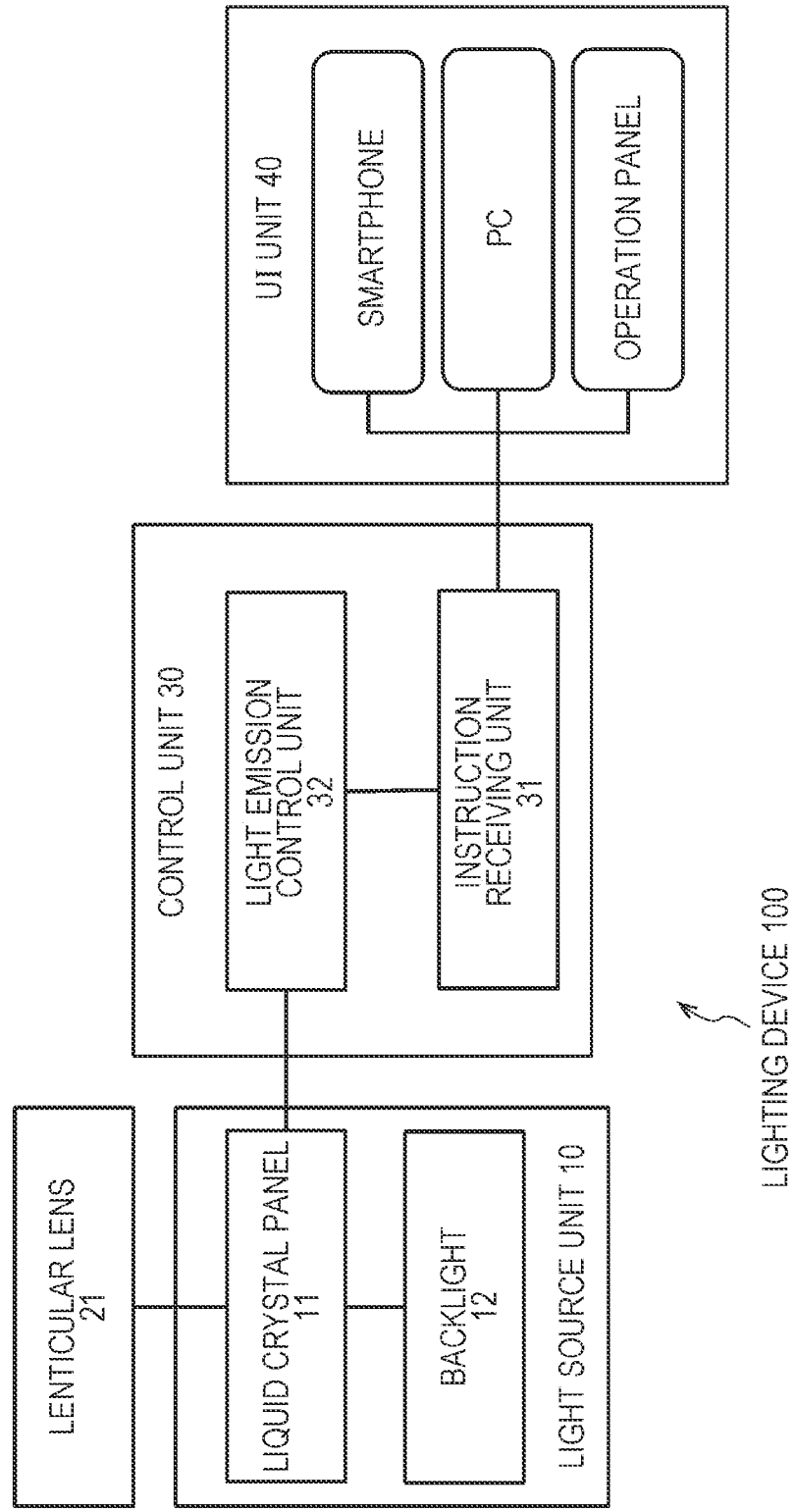
FIG. 2 is a diagram illustrating an exemplary configuration of a light source unit 10.

As illustrated in FIG. 2, for example, the light source unit 10 can include a combination of a liquid crystal panel 11 and a backlight 12. The liquid crystal panel 11 includes a color filter that transmits light of each component of red (R), green (G), and blue (B), and can partially transmit or block the light of the backlight 12 radiated from behind to control the hue and intensity of each pixel. The liquid crystal panel 11 may be a general liquid crystal panel having a structure in which a liquid crystal is sandwiched between polarizing plates whose polarization directions are orthogonal to each other. Since the structure of the liquid crystal panel 11 is well known, a detailed description thereof will be omitted here. Then, a lenticular lens 21 is superposed on the radiation surface (display surface) side of the liquid crystal panel 11.

The combination of the liquid crystal panel 11 and the backlight 12 is in part structurally similar to a liquid crystal display that is used as a computer display or a television receiver. However, the lighting device 100 according to the present embodiment also has structural differences due to the usage for the purpose of lighting, not for the purpose of displaying images. For example, it is assumed that a high-power light source is used for the backlight 12 to obtain a bright visual environment (for example, the backlight 12 includes about 1500 LED chips having a luminance of 8500 $cd/m^2$ and a total luminous flux of 20 lumens).

Figure 37:
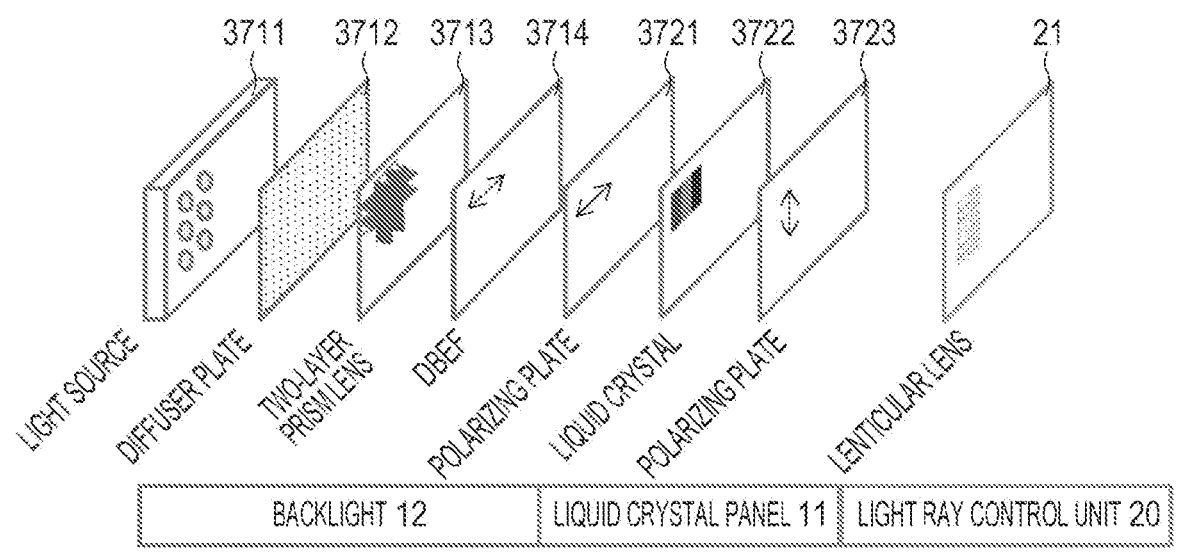
FIG. 37 is a diagram illustrating an exemplary basic configuration of the light source unit 10 and the lenticular lens 21 with the use of a liquid crystal cell.

FIG. 37 is a diagram illustrating an exemplary basic configuration of the light source unit 10 and the lenticular lens 21 with the use of a liquid crystal cell.

The backlight 12 includes a light source 3711 in which point light sources are arranged in a two-dimensional array, a diffuser plate 3712 for diffusing radiation light of each point light source, a two-layer prism lens 3713 for orienting diffused light in the front direction, and a reflective polarizing film (dual brightness enhancement film (DBEF)) 3714 which utilizes double reflection and the refractive index of light to concentrate the light rays and increase the luminance.

In addition, the liquid crystal panel 11 has a structure in which both surfaces of a liquid crystal 3722 are sandwiched between polarizing plates 3721 and 3723 on the back side and the front side disposed such that the polarization directions thereof are orthogonal to each other. The liquid crystal 3722 actually has a structure in which both surfaces of a multilayer substrate including a TFT array, an alignment film, a common electrode, a color filter, and the like are sandwiched between glass substrates, but illustration is omitted in FIG. 37 for simplicity.

The lenticular lens 21 includes a two-dimensional array of lenticules, and controls light rays from the light source unit 10. Details of the lenticular lens will be given later.

Note that instead of combining the liquid crystal panel 11 and the backlight 12, other devices such as self-luminous elements such as an organic electroluminescent (EL) element and a light emitting diode element capable of outputting high-luminance light may be used for the light source unit 10.

The UI unit 40 includes, for example, information terminals such as a smartphone, a tablet, and a personal computer (PC), an operation panel provided on the control unit 30, and the like. The user can designate a desired light source (that is, a light source that the user wishes to reproduce using the lighting device 100) through the UI unit 40. Examples of the light source that can be reproduced by the lighting device 100 can include natural light such as light filtering through trees and twilight rays as well as lighting equipment such as a spotlight and a chandelier (described later).

The control unit 30 includes an instruction receiving unit 31 that receives an instruction from the UI unit 40 and a light emission control unit 32 that controls light emission of the light source unit 10 according to the light source to be reproduced.

Figure 3:
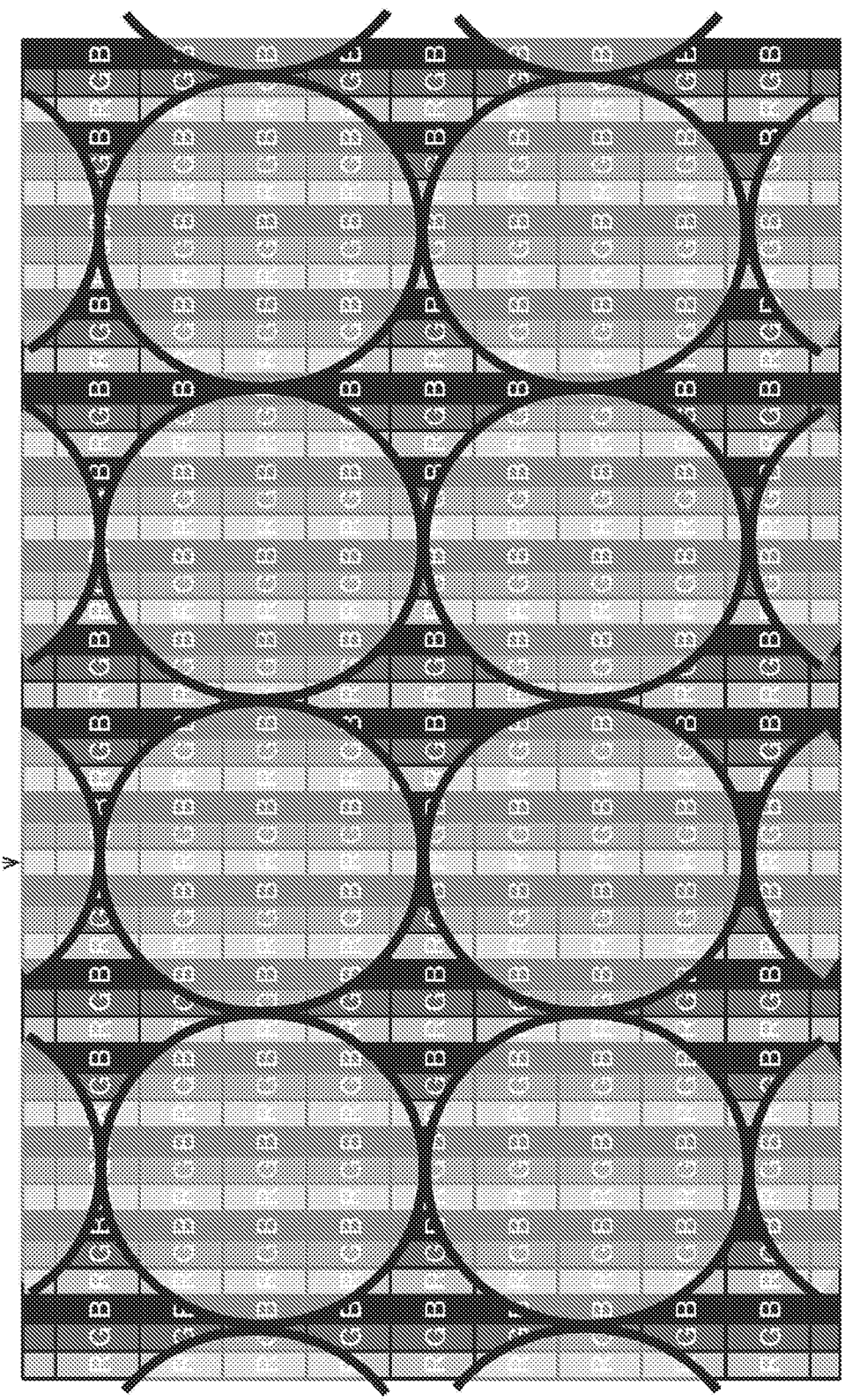
FIG. 3 is a diagram illustrating a plan view of the light source unit 10 and a lenticular lens 21.

FIG. 3 is a diagram illustrating a plan view of the light source unit 10 and the lenticular lens 21. Note that the color arrangement of R, G, and B in the liquid crystal panel 11 is not limited to the illustration. For example, it may be a Bayer array (two pixels in 2×2 pixels of a unit array are arranged diagonally as G pixels, and the other two pixels are arranged as R and B pixels). In the illustrated example, each pixel includes three colors of R, G, and B, and constitutes a light source capable of adjusting hue and intensity. Then, by determining the size and arrangement of the lenticular lens 21 such that a plurality of pixels is included below each lenticule, a plurality of light sources capable of adjusting hue and intensity is associated with each lenticule, and the emission direction of radiation light of each light source can be controlled by the lenticule. Although FIG. 3 is depicted in a simplified manner, one lenticule has, for example, such a size as to cover 20×20 pixels.

Figure 4:
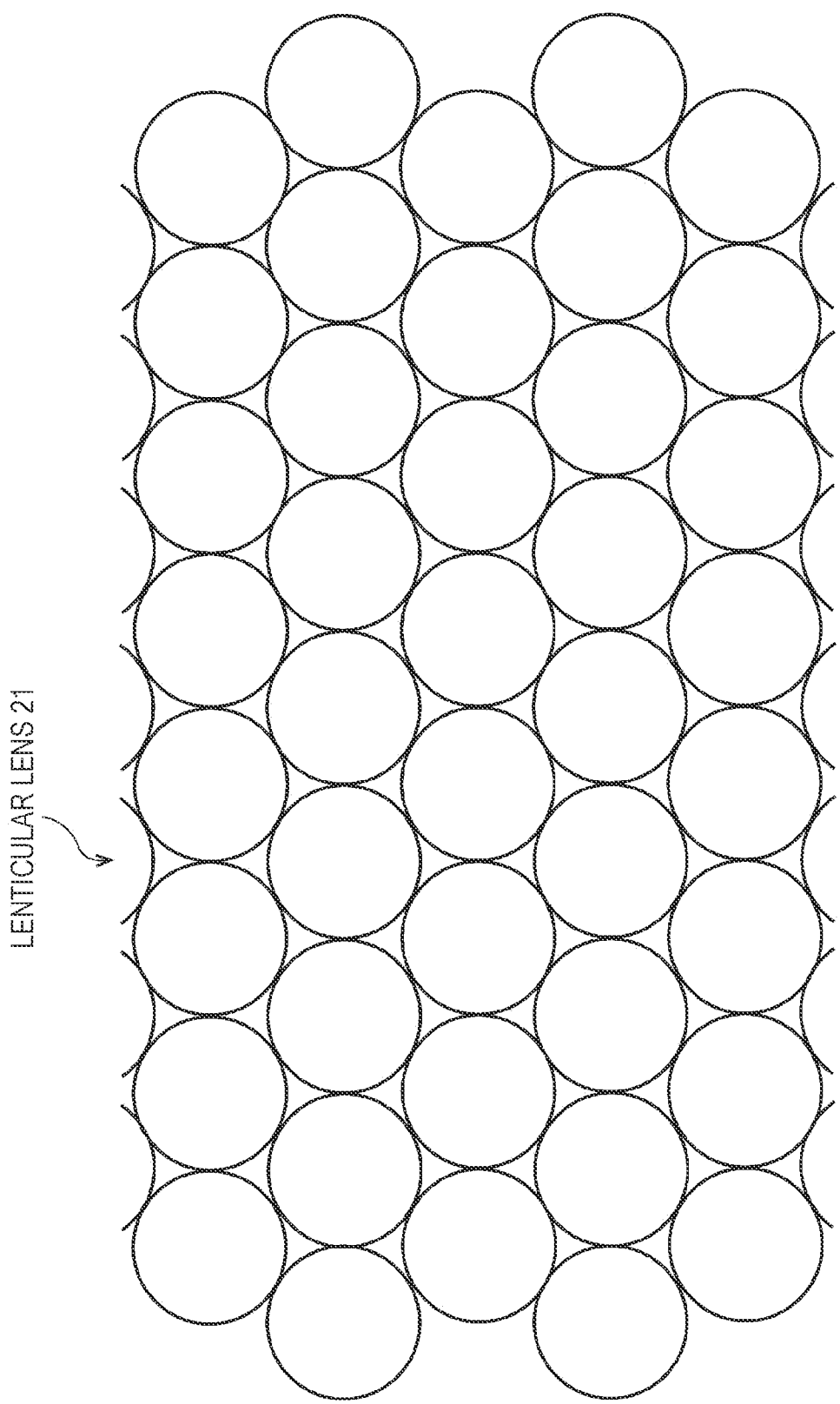
FIG. 4 is a diagram illustrating another arrangement example of lenticules in the lenticular lens 21.

In the example illustrated in FIG. 3, the lenticular lens 21 adopts a square arrangement in which lenticules are arranged in a square lattice shape, but the arrangement of lenticules is not limited thereto. Another arrangement method for increasing the filling factor of lenticules may be adopted so that the granularity of light ray control can be made finer. FIG. 4 is a diagram illustrating another arrangement example of lenticules in the lenticular lens 21. In the example illustrated in FIG. 4, a delta arrangement is adopted in which the arrangement of lenticules is shifted by a half pitch for each row so that the lenticules are arranged such that the centers of the adjacent lenticules form a delta shape (triangle). As a result, the filling factor of lenticules is increased. In any lenticular arrangement, the size and arrangement of the lenticular lens 21 are determined such that a plurality of light sources capable of adjusting hue and intensity is included below each lenticule.

Figure 5:
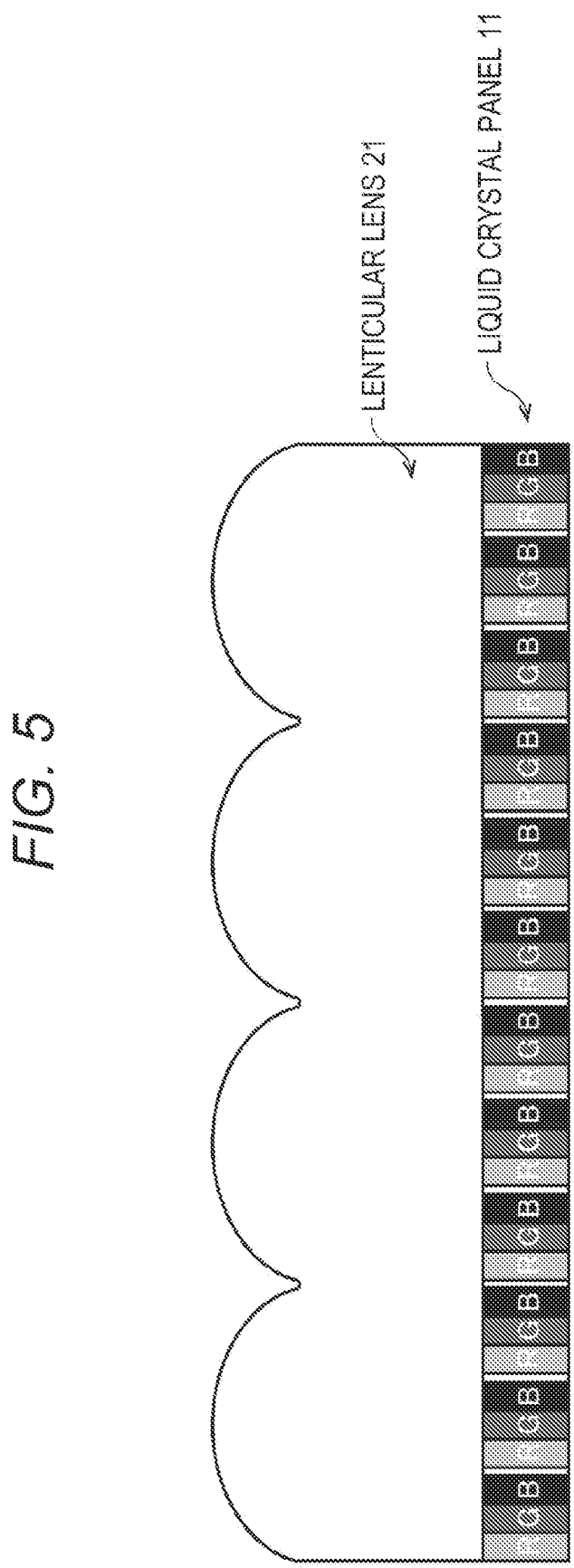
FIG. 5 is a diagram illustrating a cross-section of the light source unit 10 and the lenticular lens 21.

FIG. 5 is a diagram illustrating a cross-section of the lighting device including the light source unit 10 and the lenticular lens 21. Note that, for the sake of simplicity of the drawing, it is assumed that three pixels of the liquid crystal panel 11 are placed below each lenticule in the horizontal direction on the paper as a plurality of light sources capable of adjusting hue and intensity.

The lenticular lens 21 includes a material such as acrylic, polyethylene terephthalate (PET), and polypropylene (PP), for example, and can be manufactured by 3D printing or can be mass-produced by using a molding technology such as injection molding, for example. One lenticule is a microlens with a convex (spherical or aspherical) lens formed on one end face of a cylinder. Each lenticule controls light rays of emission light from each pixel according to the height of the cylinder, the shape of the convex face of the surface (curvature), the refractive index of a substance, the position relative to the lower pixels, and the like.

FIG. 6 is a diagram illustrating the directions of light rays emitted from one lenticule. In a case where three pixels arranged below one lenticule emit beams of light of red (R), green (G), and blue (B) in order from the left, and the beams of light enter the bottom surface of the lenticule, as illustrated in FIG. 6(A), a red light ray 601 is emitted in the upper right direction of the lenticule. Further, a green light ray 602 is emitted in the front direction as illustrated in FIG. 6(B), and a blue light ray 603 is emitted in the upper left direction as illustrated in FIG. 6 (C).

Figure 7:
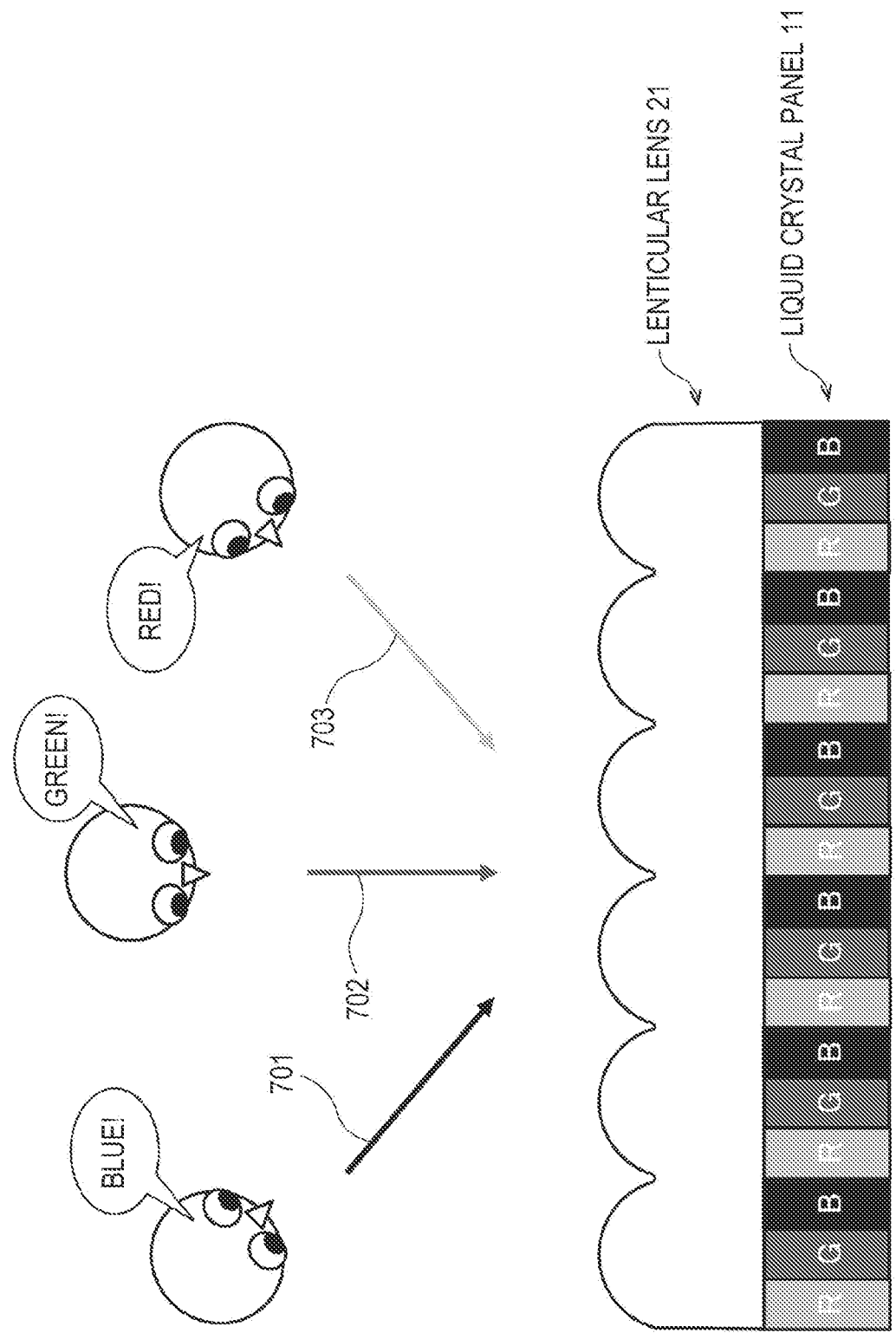
FIG. 7 is a diagram illustrating colors observed when the lighting device illustrated in FIG. 5 is viewed in different directions.

FIG. 7 is a diagram illustrating colors observed when the lighting device illustrated in FIG. 5 is viewed in different directions. Note that, as illustrated in FIG. 6, three pixels arranged below each lenticule radiate red (R), green (G), and blue (B) beams of light in order from the left, and the lighting device as a whole emits a red light ray to the right, a green light ray in the front direction, and a blue light ray to the left. Therefore, blue, green, and red colors are observed when the lighting device is viewed from a left side 701, a front side 702, and a right side 703, respectively.

The hue and intensity of the light emitted from each lenticule can be controlled by the liquid crystal panel 11, and the emission direction of each light ray can be controlled by the lenticule. Therefore, the lighting device 100 according to the present embodiment can control parameters such as the light ray direction in addition to the hue and intensity, so that various light sources can be reproduced. The light source as used herein includes a wide range of light sources including real light sources (e.g., natural light such as sunlight) and imaginary light sources (e.g., a spotlight, a chandelier, and the like).

B. Exemplary Configuration of Lenticular Lens

In the lighting device 100 according to the present embodiment, the lenticular lens 21 plays a role of controlling light rays from the light source unit 10. The lenticular lens is a microlens with a convex (spherical or aspherical) lens formed on one end face of a cylinder, and the emission angle can be determined according to the height of the cylinder, the shape of the convex face of the surface (curvature), the refractive index of a substance, the position relative to the lower pixels, and the like.

Figure 24:
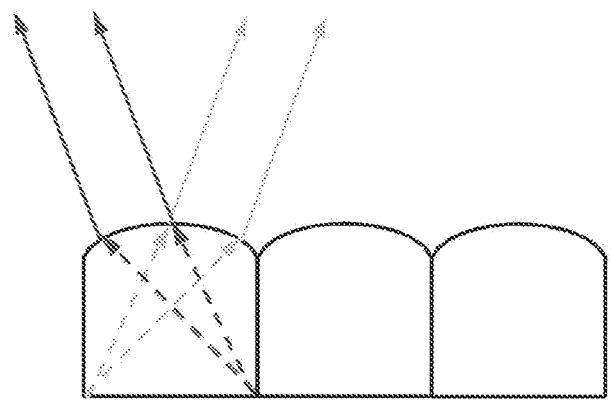
FIG. 24 is a diagram illustrating an exemplary configuration of the lenticular lens with a widened emission angle.
Figure 25:
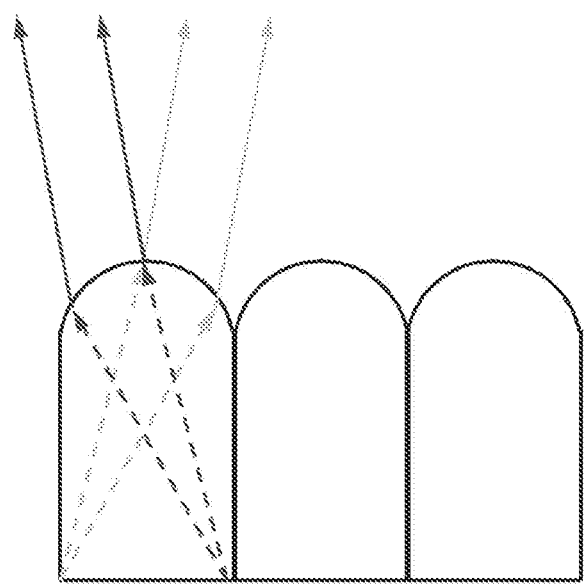
FIG. 25 is a diagram illustrating an exemplary configuration of the lenticular lens with a narrowed emission angle.

FIG. 24 is a diagram illustrating an exemplary configuration of the lenticular lens with a widened emission angle realized by a reduced height of the lens and a reduced curvature of the convex face. In addition, FIG. 25 is a diagram illustrating an exemplary configuration of the lenticular lens with a narrowed emission angle realized by an increased height of the lens and an increased curvature of the convex face.

Figure 26:
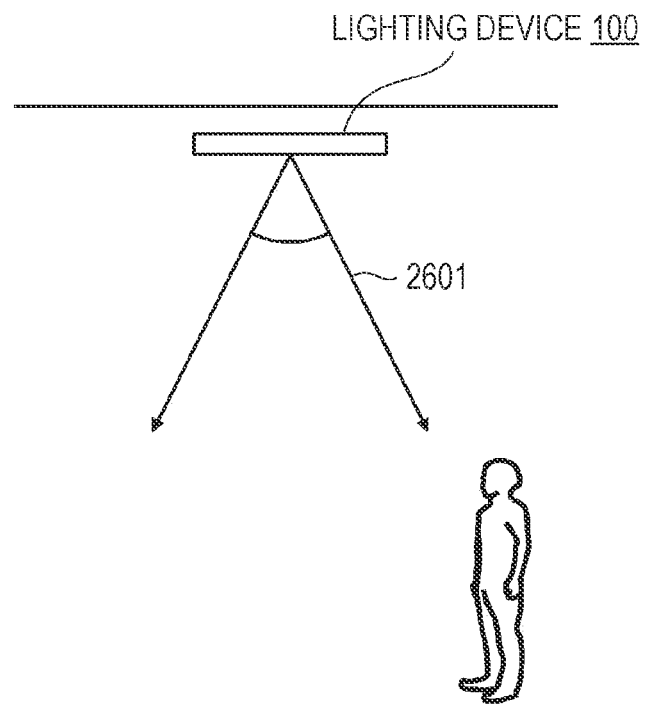
FIG. 26 is a diagram for explaining the radiation angle of light from the lenticular lens.
Figure 27:
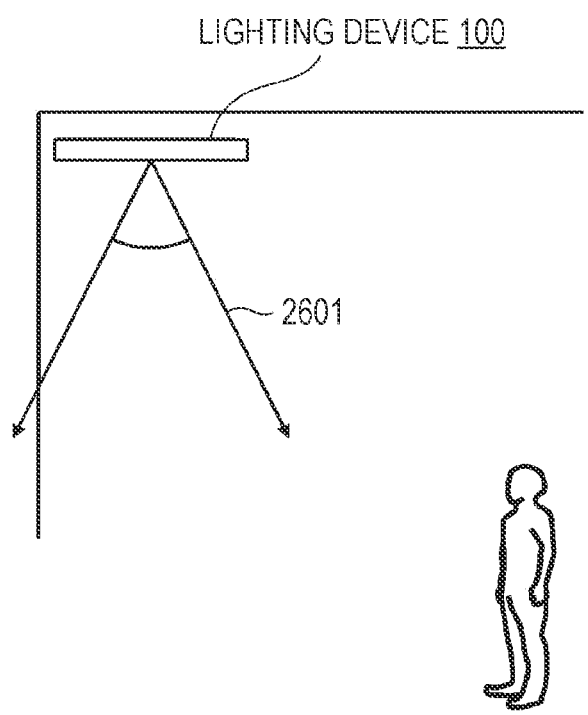
FIG. 27 is a diagram for explaining the radiation angle of light from the lenticular lens.

Further, as illustrated in FIG. 26, the lighting device 10 using the lenticular lens including bilaterally symmetric (or rotationally symmetric) lenticules radiates light 2601 whose center of the emission angle is oriented substantially to the front and whose radiation angle is bilaterally symmetric. However, as illustrated in FIG. 27, in a case where the lighting device 10 is installed adjacent to a wall, there is no need to radiate light in the direction toward the wall, in other words, the component of the radiation light 2601 radiated to the wall is wasted.

Figure 28:
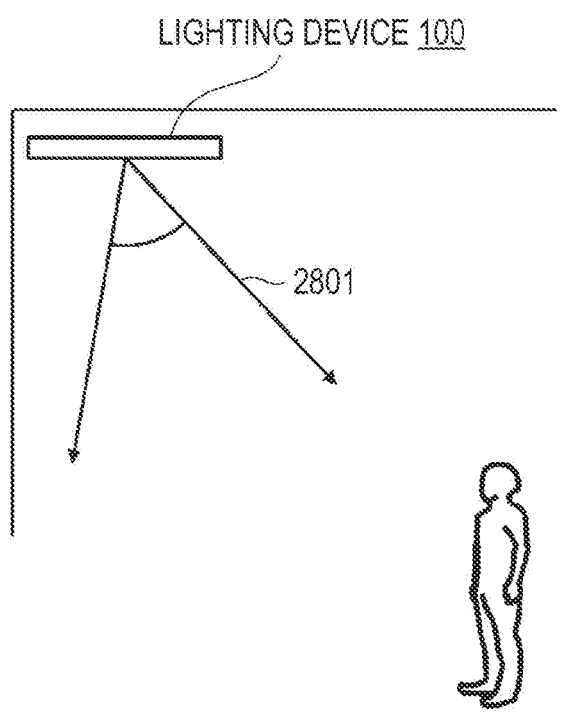
FIG. 28 is a diagram for explaining the radiation angle of light from the lenticular lens.
Figure 29:
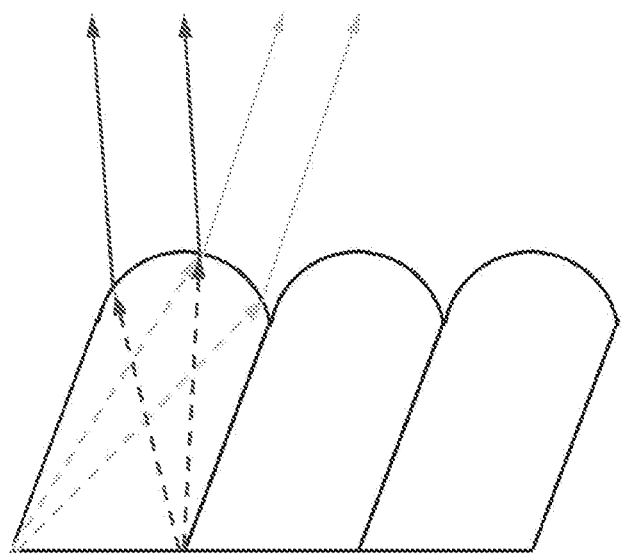
FIG. 29 is a diagram for explaining the radiation angle of light from the lenticular lens.
Figure 30:
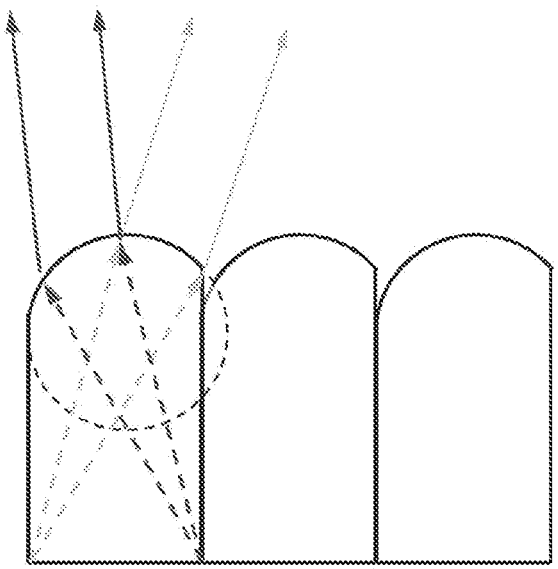
FIG. 30 is a diagram for explaining the radiation angle of light from the lenticular lens.

As illustrated in FIG. 28, it is efficient for the lighting device 100 installed adjacent to the wall to change the radiation angle of light 2801 such that the emission angle is oriented inside the room since the room can be made brighter with the same amount of light. The radiation direction of light can be controlled by the shape of the lenticular lens. FIG. 29 is a diagram illustrating how the radiation direction of light is inclined using a lenticular lens including lenticules inclined in one direction. In addition, FIG. 30 is a diagram illustrating how the radiation direction of light is inclined using a lenticular lens including lenticules having lenses (convex portions) deviated from the center. For example, by applying the lenticular lens illustrated in FIG. 29 or 30, the lighting device 100 can change the radiation angle of the light 2801 such that the emission angle is oriented inside the room as illustrated in FIG. 28.

Figure 31:
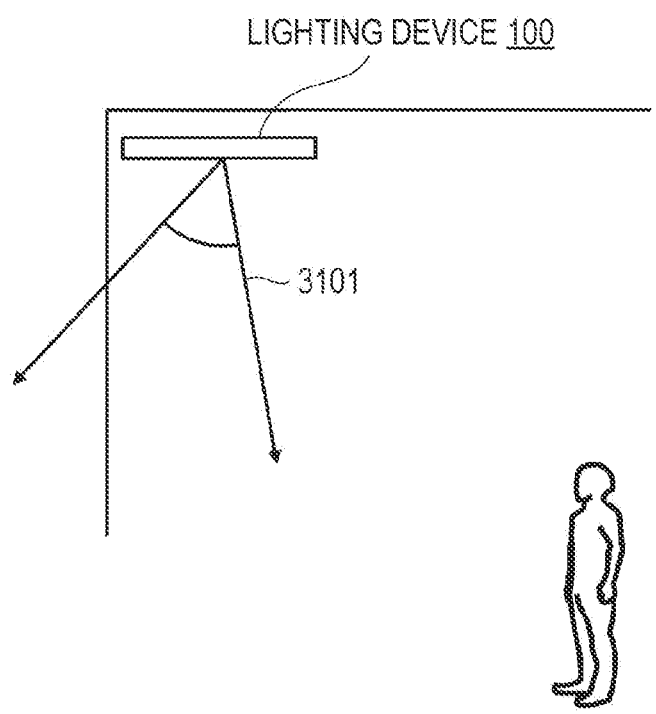
FIG. 31 is a diagram for explaining the radiation angle of light from the lenticular lens.

Note that as illustrated in FIG. 31, by using the lighting device 100 in which the radiation angle of light 3101 is changed such that the emission angle is oriented to the wall of the room, it is also possible to realize indirect illumination that illuminates the wall.

In addition, in a space like an elongated corridor, if the radiation angle of the lighting device 100 is uniform around 360 degrees, the component that irradiates the wall increases in the width direction of the corridor, whereas the radiation light does not spread from end to end in the length direction of the corridor, resulting in the occurrence of a dark spot. Therefore, as illustrated in FIG. 32, in consideration of the shape of the space (room) in which the lighting device 100 is installed, the lighting device 100 is set such that the emission angle of radiation light 3201 is narrow in the x direction in which the distance between the walls is short, and such that the emission angle of the radiation light 3201 is wide in the y direction in which the distance between the walls is long, whereby the entire space can be efficiently brightened.

Figure 33:
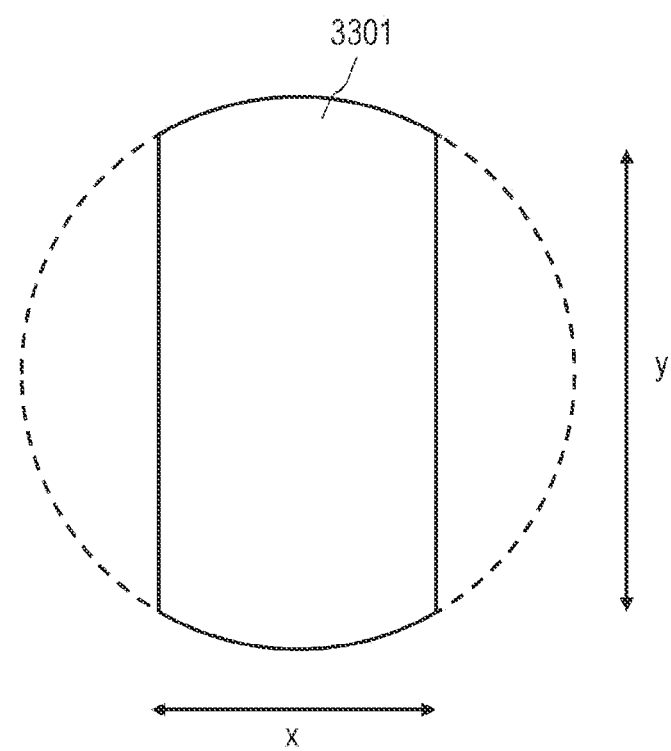
FIG. 33 is a diagram for explaining the radiation angle of light from the lenticular lens.

FIG. 33 is a diagram illustrating an exemplary configuration of the lenticular lens having different emission angles in the x and y directions. A general lenticule is shaped such that a convex lens is formed on the upper surface of a cylinder. On the other hand, a lenticule 3301 illustrated in FIG. 33 is shaped such that only the central portion of a cylinder is cut in the x direction. FIG. 34 is a diagram illustrating the emission angles in the x and y directions of the lenticule 3301 illustrated in FIG. 33. Since only the central portion is cut in the x direction to form the lenticule 3301, the emission angle is narrowed by both cut ends. Therefore, the lighting device 100 as a whole radiates light in a narrow range in the x direction. On the other hand, since the lenticule 3301 has the original lens shape in the y direction, the emission angle is not narrowed and is wider than that in the x direction. Therefore, the lighting device 100 as a whole radiates light in a wide range in the y direction.

Figure 35:
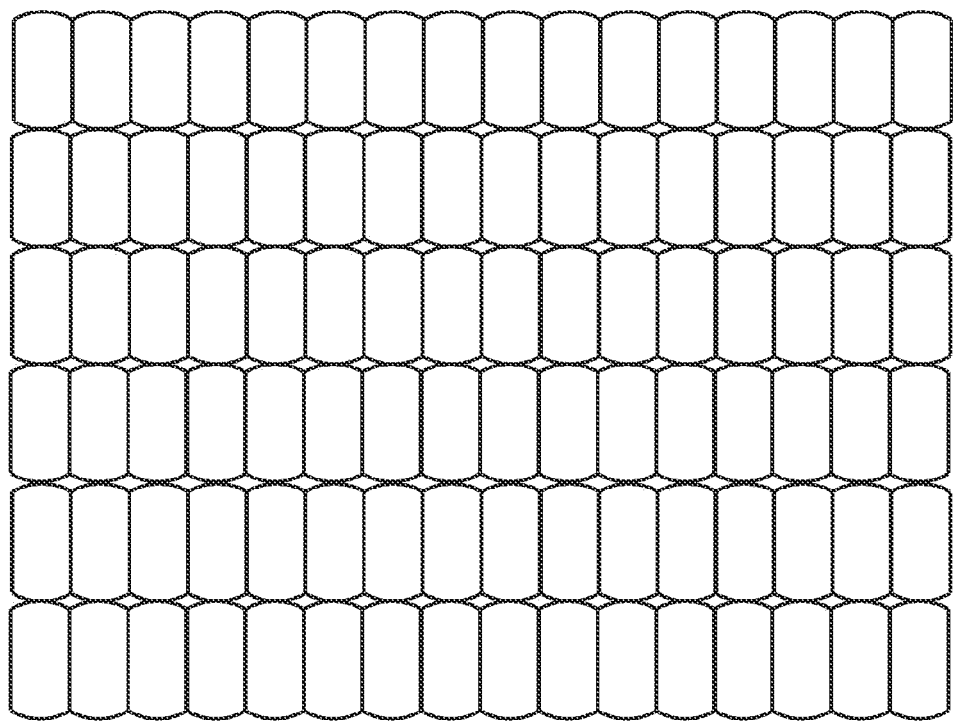
FIG. 35 is a diagram illustrating an exemplary configuration of the lenticular lens.
Figure 36:
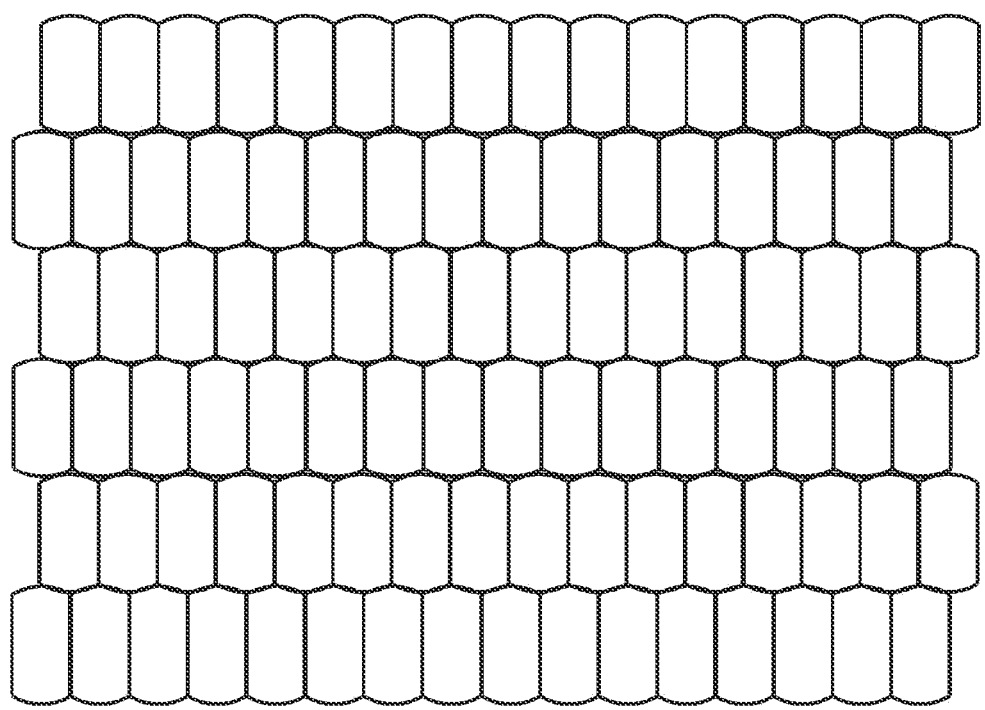
FIG. 36 is a diagram illustrating an exemplary configuration of the lenticular lens.

Note that the lenticular lens having different emission angles for the respective directions as illustrated in FIG. 33 can also employ an exemplary configuration in which the respective lenticules are provided in the square arrangement as illustrated in FIG. 35 or employ an exemplary configuration in which the respective lenticules are provided in the delta arrangement as illustrated in FIG. 36.

C. About Problem of Crosstalk

As explained with reference to FIGS. 6 to 7, within the emission angle of the lenticular lens 21, it is possible to observe light with the light rays properly controlled. However, when observing from outside the emission angle of the lenticular lens 21, since emission light from the pixel below the adjacent lenticule is observed, the problem of color repetition occurs. In the example illustrated in FIG. 8, the three pixels arranged below each lenticule radiate red (R), green (G), and blue (B) beams of light in order from the left (as in the case of FIG. 6). Here, when observing emission light from a lenticule 812 from outside the emission angle, due to the occurrence of crosstalk that causes a red light ray 801 emitted from the pixel below a right lenticule 811 to enter the lenticule 812 too, the red light ray 801 is repeatedly observed on the left side of the emission angle. Similarly, due to the crosstalk that causes a blue light ray 803 emitted from the pixel below a left lenticule 813 to enter the lenticule 812 too, the blue light ray 803 is repeatedly observed on the right side of the emission angle.

Figure 9:
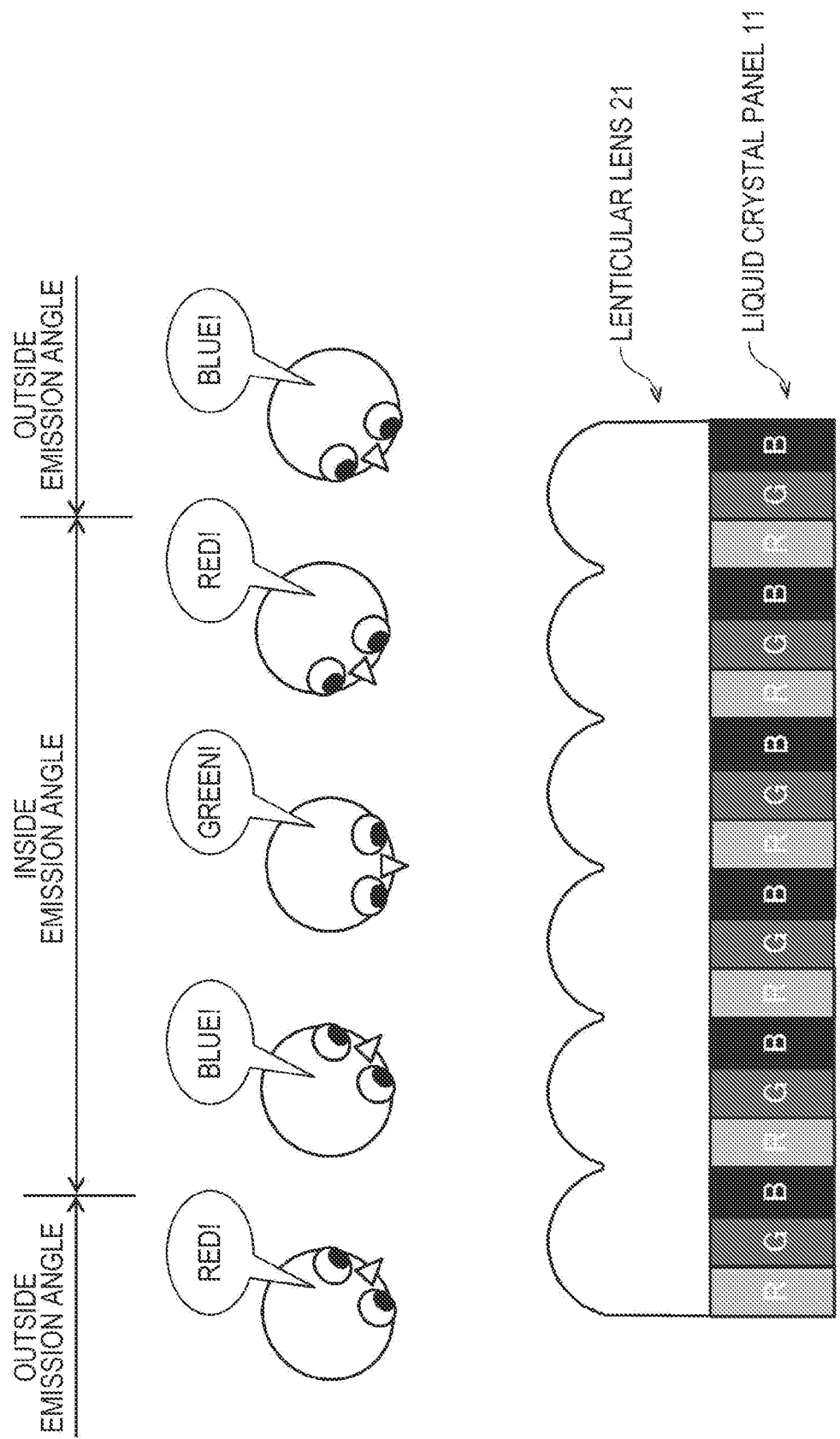
FIG. 9 is a diagram illustrating how colors observed when the lighting device illustrated in FIG. 5 is viewed from outside the emission angle repeat.

In FIG. 7, the colors observed when the lighting device 100 is viewed in the directions within the emission angle are illustrated, and blue, green, and red are observed in order from the left. On the other hand, when the lighting device 100 is further viewed from outside the emission angle, as illustrated in FIG. 9, blue, green, and red are repeatedly observed on the right external side of the emission angle, and red, green, and blue are repeatedly observed on the left external side of the emission angle.

Figure 10:
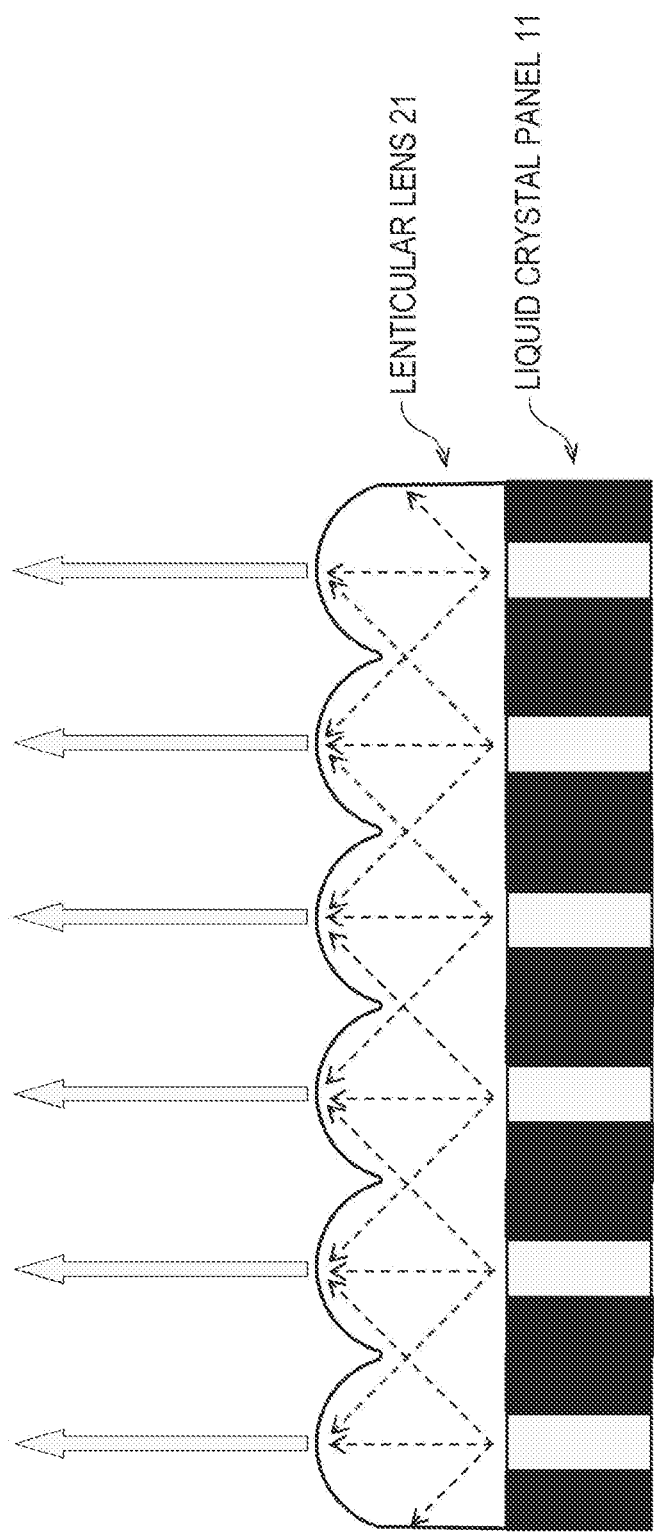
FIG. 10 is a diagram illustrating how beams of light are radiated by the lighting device 100 only in the front direction.
Figure 11:
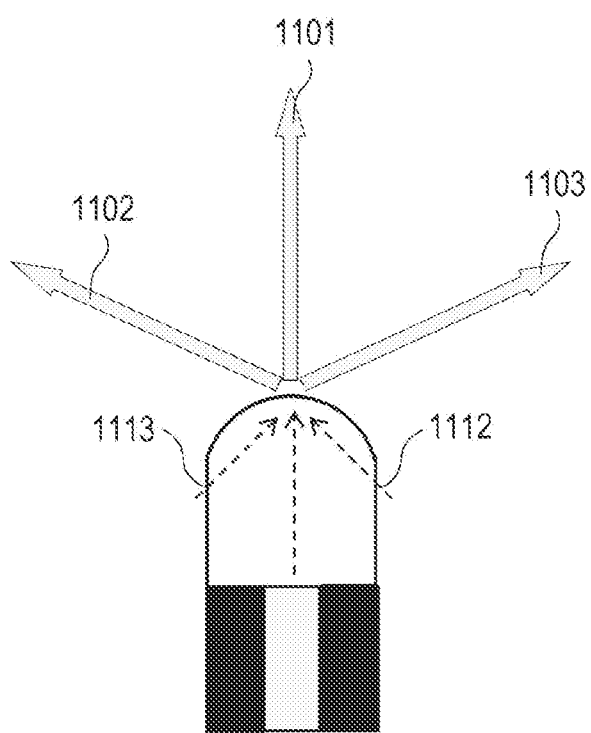
FIG. 11 is a diagram illustrating how light repeats even at positions other than the front of the lighting device 100.

Problems caused by the repetition of observed colors when viewing the lighting device 100 from outside the emission angle will be described with reference to FIGS. 10 and 11. When it is desired to reproduce a light source such as a spotlight by radiating light only in the front direction in a certain region of the lighting device 100, light only needs to be radiated from the center of the pixels arranged below each lenticule within the region. However, due to the entry of beams of radiation light 1112 and 1113 from the pixels below the adjacent lenticules, that is, due to the crosstalk, not only light 1101 in the front direction but also beams of light 1102 and 1103 in the directions toward the outside of the emission angle are radiated as illustrated in FIG. 11, and the spotlight effect cannot be obtained.

Figure 12:
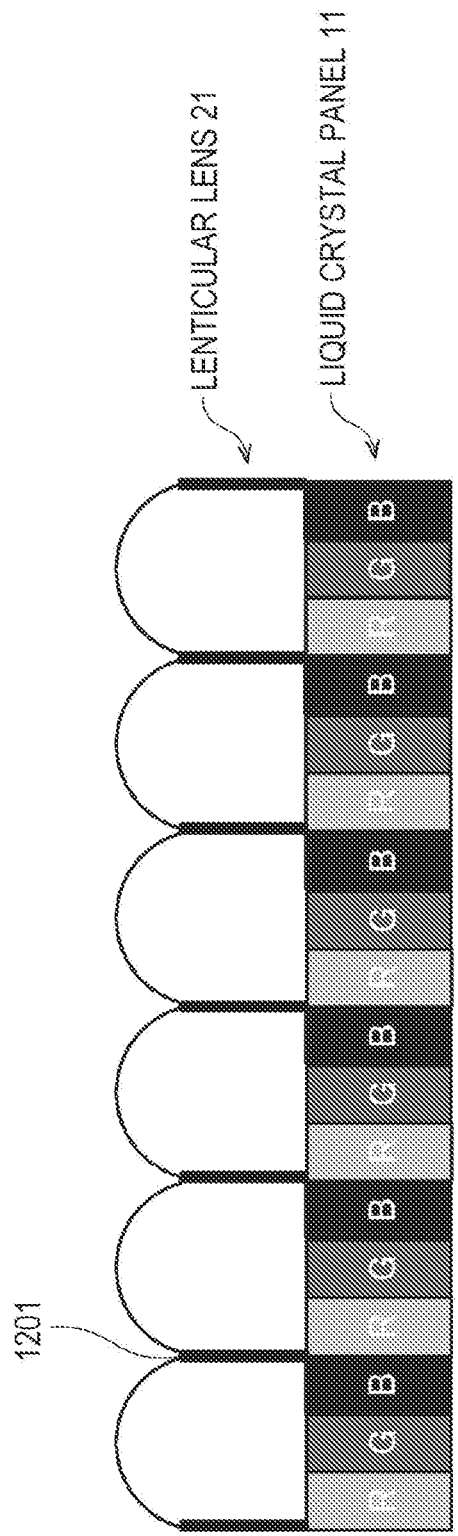
FIG. 12 is a diagram illustrating an exemplary configuration of an improved lenticular lens 21.

FIG. 12 is a diagram illustrating an exemplary configuration of an improved lenticular lens 21 that prevents light being observed outside the emission angle (that is, prevents repetition). One lenticule is a microlens with a convex (spherical or aspherical) lens formed on one end face of a cylinder (as described above). In the example illustrated in FIG. 12, a (opaque or light-blocking) partition 1201 that does not transmit light is formed on the outer periphery of the cylindrical portion of each lenticule. The emission light from the pixel below the adjacent lenticule is blocked by this partition 1201, which prevents the occurrence of crosstalk and thus prevents the occurrence of repetition, i.e., a phenomenon in which the light ray emitted from the pixel below the adjacent lenticule is repeatedly observed outside the emission angle. As a result, the lighting device 100 can accurately adjust parameters such as the positions and number of light sources and how the light spreads, so that various light sources can be more realistically reproduced.

Figure 13:
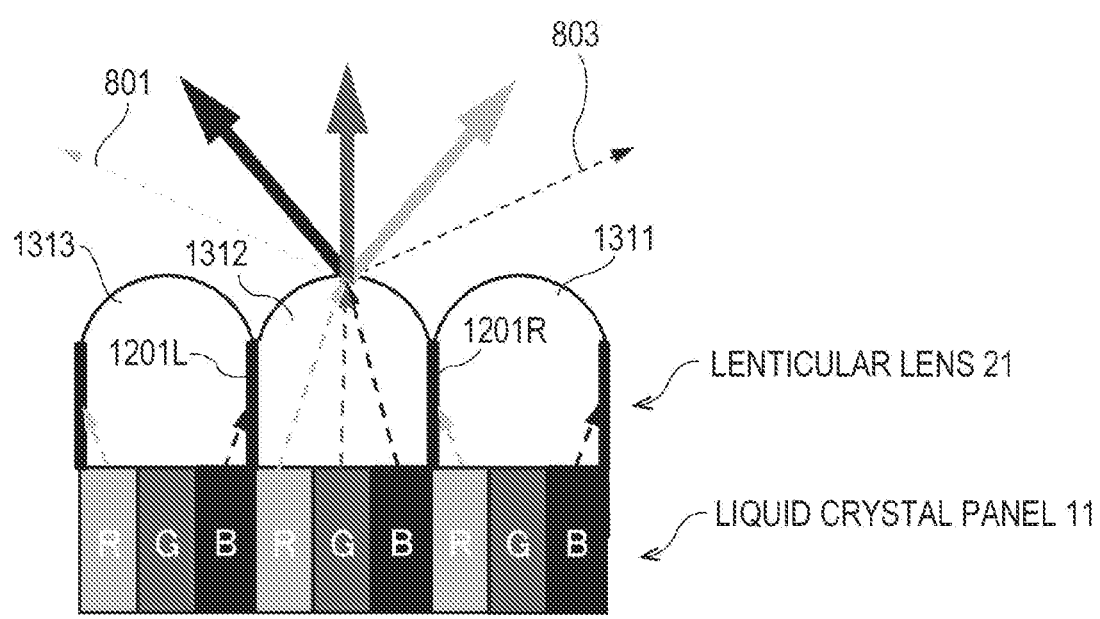
FIG. 13 is a diagram illustrating how colors do not repeat when observed from outside the emission angle of the improved lenticular lens.

In the example illustrated in FIG. 13, the three pixels arranged below each lenticule radiate red (R), green (G), and blue (B) beams of light in order from the left (as in the case of FIG. 8). Here, when observing emission light from a lenticule 1312 from outside the emission angle, since the red light ray (indicated by a dotted line in the drawing) 801 emitted from the pixel below a right lenticule 1311 is blocked by a partition 1201R, the occurrence of crosstalk is prevented, and the red light ray 801 is not repeatedly observed on the left side of the emission angle. Similarly, since the blue light ray (indicated by a dotted line in the drawing) 803 emitted from the pixel below a left lenticule 1313 is blocked by a partition 1201L, the occurrence of crosstalk is prevented, and the blue light ray 803 is not repeatedly observed on the right side of the emission angle.

Figure 14:
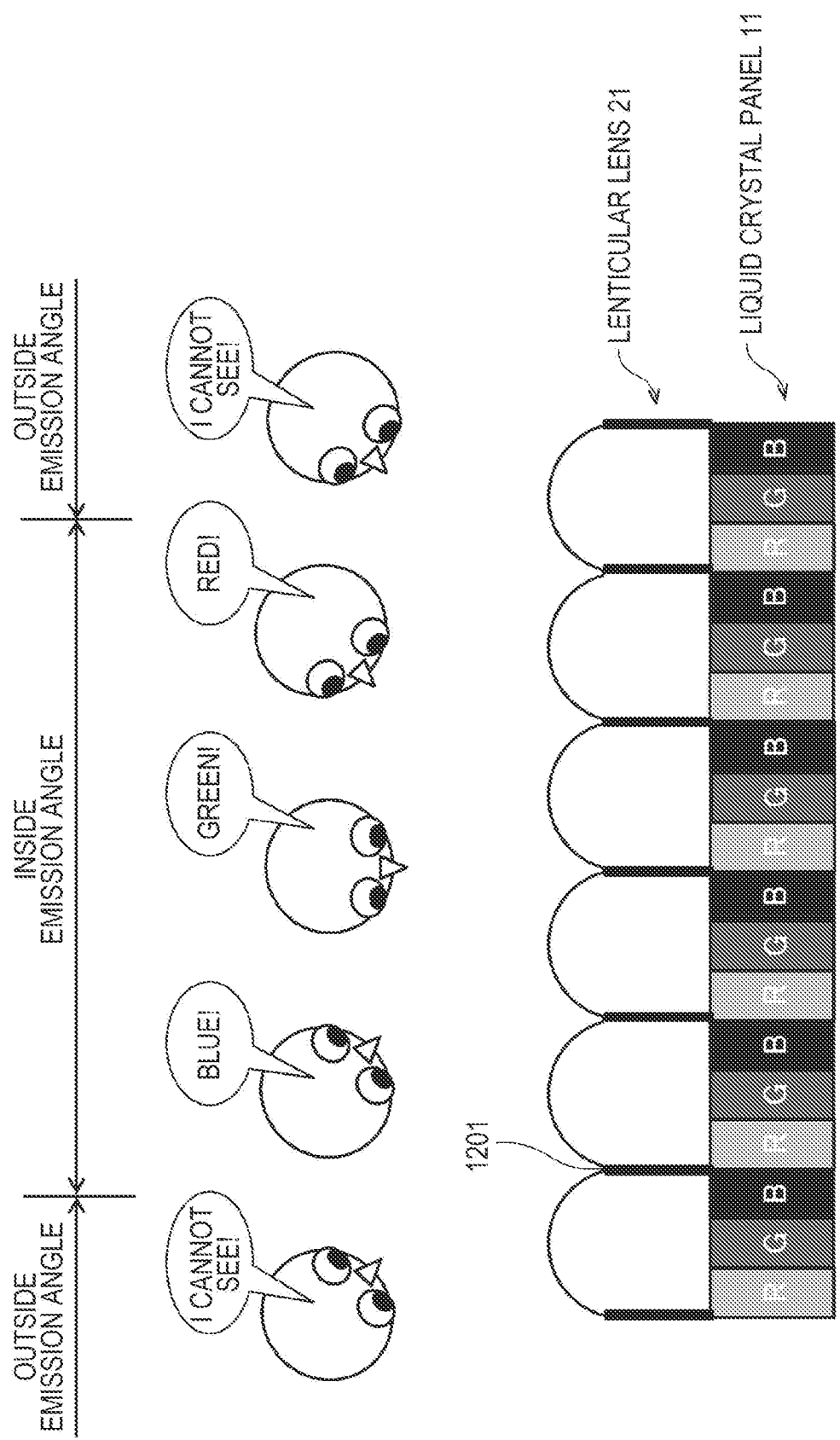
FIG. 14 is a diagram illustrating how colors observed when a lighting device with the improved lenticular lens is viewed from outside the emission angle do not repeat.

As illustrated in FIG. 14, when the lighting device 100 is viewed in the directions within the emission angle, blue, green, and red are observed in order from the left. However, since the light radiated from the pixel below the adjacent lenticule is blocked by the partition 1201, images are not repeatedly observed outside the emission angle.

Figure 38:
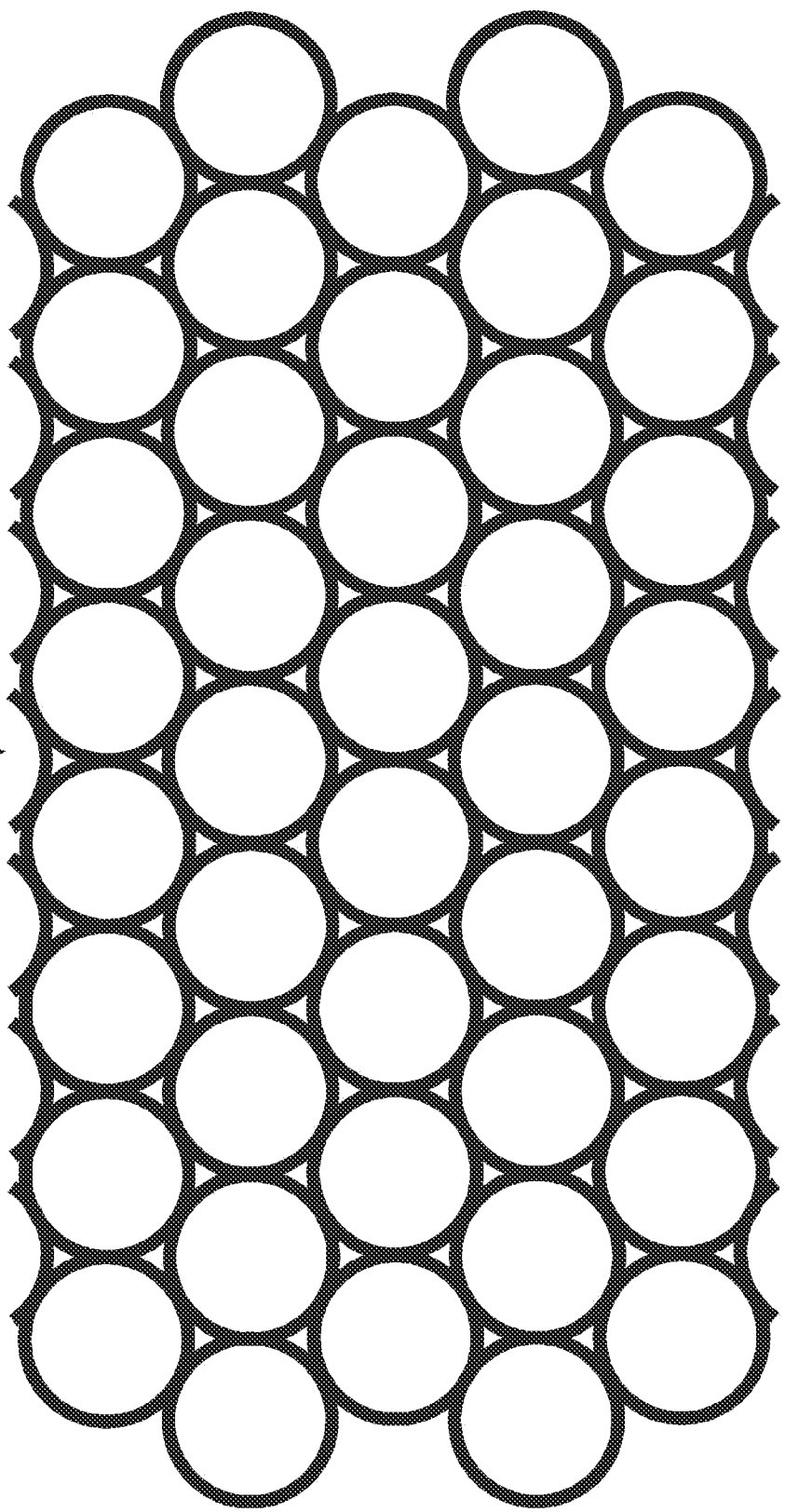
FIG. 38 is a diagram illustrating how a lenticular lens including lenticules provided with partitions looks when viewed from above.

FIG. 38 is a diagram illustrating how a lenticular lens including lenticules provided with partitions looks when viewed from above. In this drawing, an exemplary configuration in which the lenticules are provided in the delta arrangement is illustrated, but crosstalk can be similarly resolved by the square arrangement.

Figure 39:
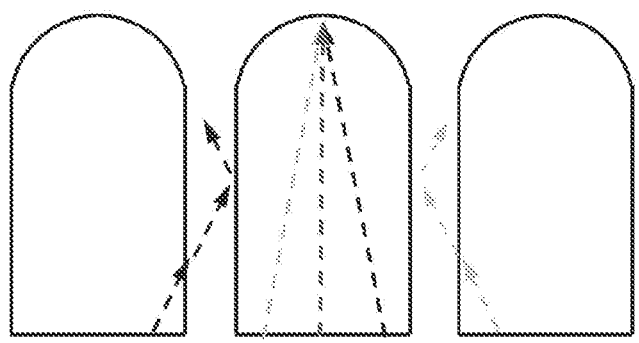
FIG. 39 is a diagram illustrating a cross-section of a lenticular lens including lenticules arranged apart from one another.
Figure 40:
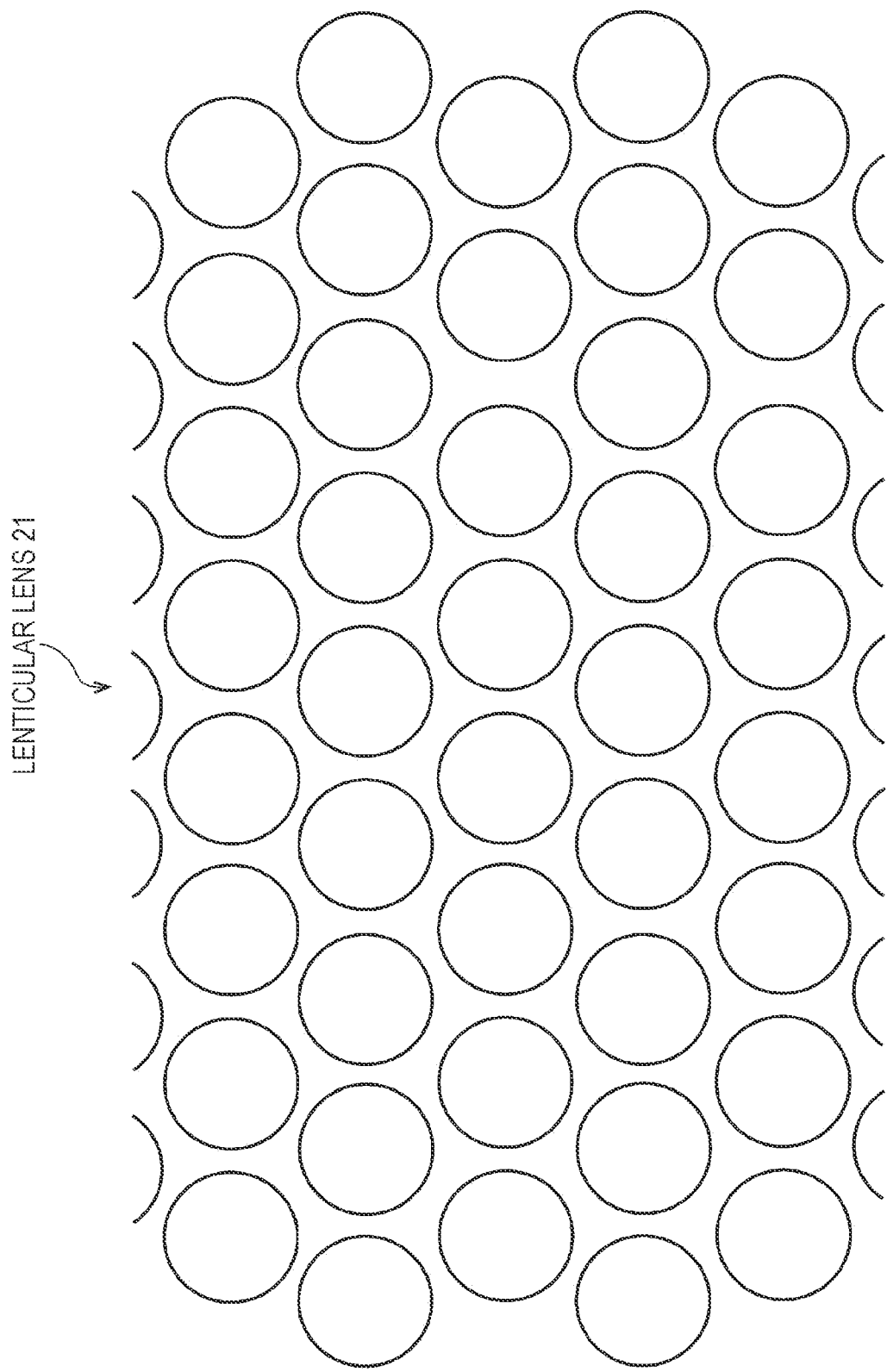
FIG. 40 is a diagram illustrating how the lenticular lens including the lenticules arranged apart from one another looks when viewed from above.

In addition, FIG. 39 is a diagram illustrating a cross-sectional configuration of a lenticular lens including lenticules arranged apart from one another. Further, FIG. 40 is a diagram illustrating how the lenticular lens including the lenticules arranged apart from one another looks when viewed from above. If the lenticules are arranged apart from one another as illustrated in FIGS. 39 and 40, light leaked from the side surface of a lenticule hardly enters the adjacent lenticule, so that crosstalk can be suppressed. In this drawing, an exemplary configuration in which the lenticules are provided in the delta arrangement is illustrated, but crosstalk can be similarly resolved by the square arrangement. In addition, even in a case where the lenticules are arranged apart from one another, the effect of suppressing crosstalk can be further enhanced by forming opaque or light-blocking partitions on the side surfaces of the respective lenticules.

Figure 8:
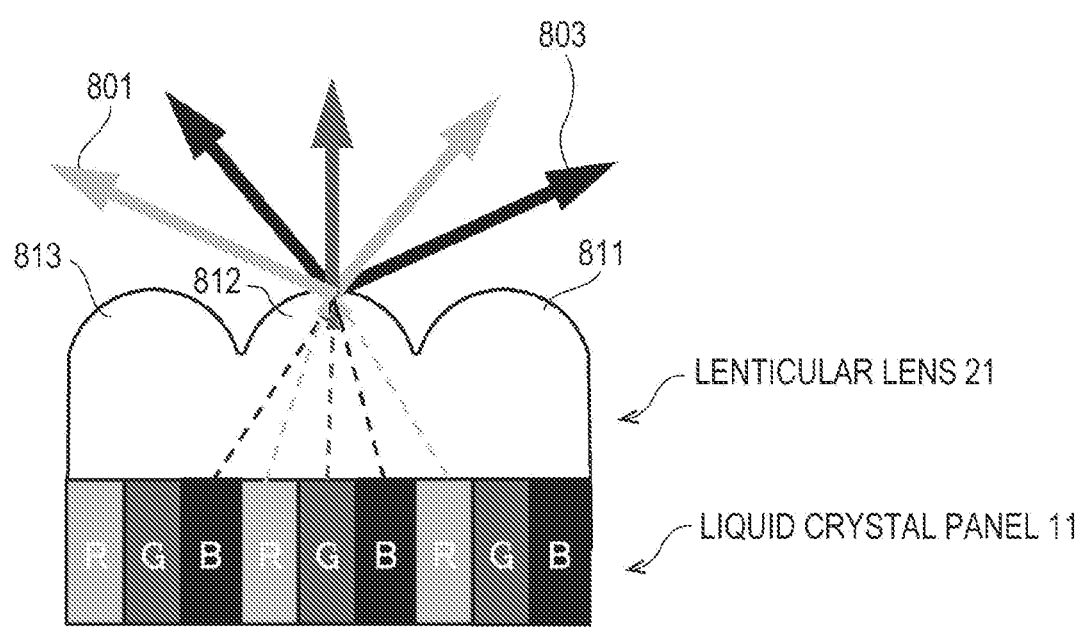
FIG. 8 is a diagram illustrating how colors repeat when observed from outside the emission angle of the lenticular lens 21.
Figure 41:
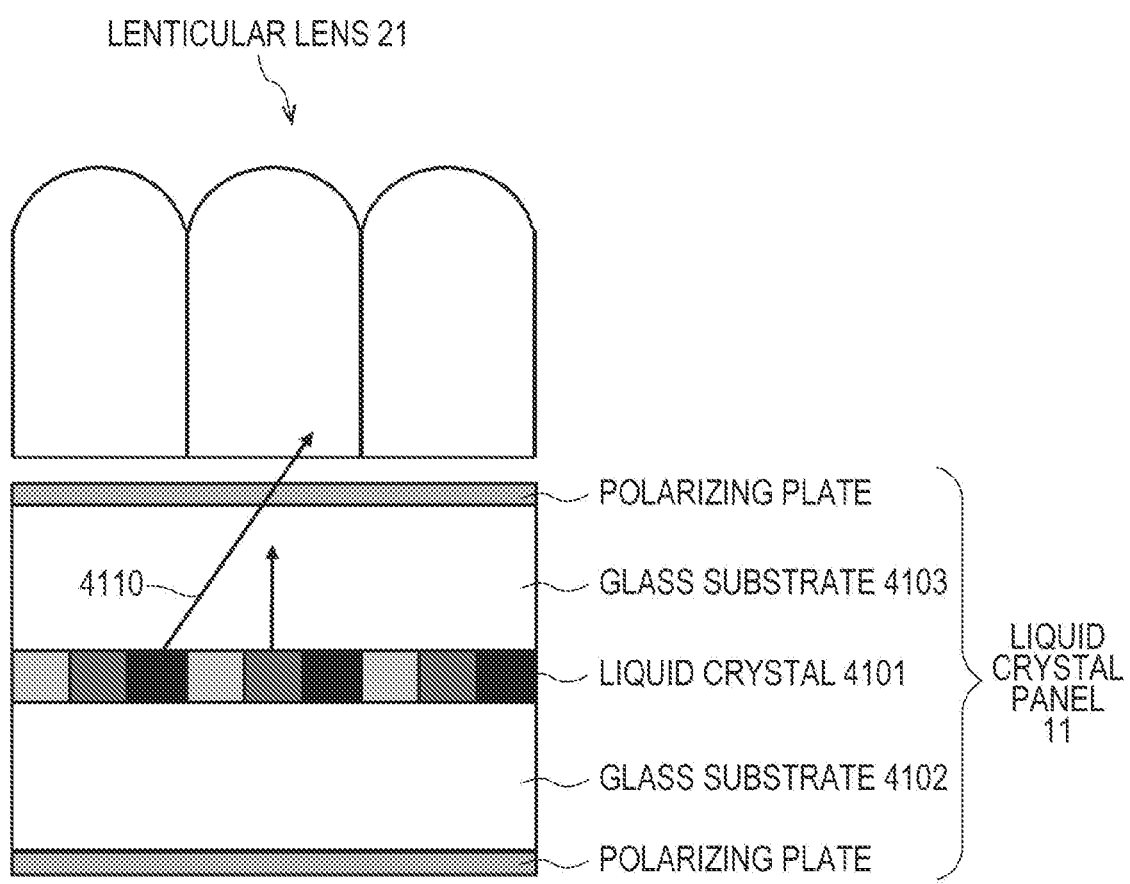
FIG. 41 is a diagram for explaining the problem of crosstalk caused by incident light from the adjacent pixel.

The cause of crosstalk is not limited to light entering from adjacent lenticules as illustrated in FIGS. 8 and 11. For example, as illustrated in FIG. 41, crosstalk also occurs due to the entry of light from a pixel that should enter the adjacent lenticule. The liquid crystal panel 11 has a structure in which both surfaces of a liquid crystal 4101 are sandwiched between thick glass substrates 4102 and 4103 (for example, having a thickness of about 700 microns). Therefore, since the liquid crystal 4101 and the lenticular lens 21 are spaced apart from each other, as indicated by reference numeral 4110, light from a pixel that should enter the adjacent lenticule is likely to enter at a large incident angle, and crosstalk occurs due to the incident light from the adjacent pixel.

A possible method of suppressing crosstalk due to incident light from adjacent pixels includes limiting the incident angle of incident light on the lenticular lens. For example, a louver layer in which innumerable louvers are densely arranged in parallel is arranged in front of the lenticular lens, and the incident angle of incident light on the lenticular lens is limited to a predetermined value or less, so that incident light from the adjacent pixel can be removed.

Figure 42:
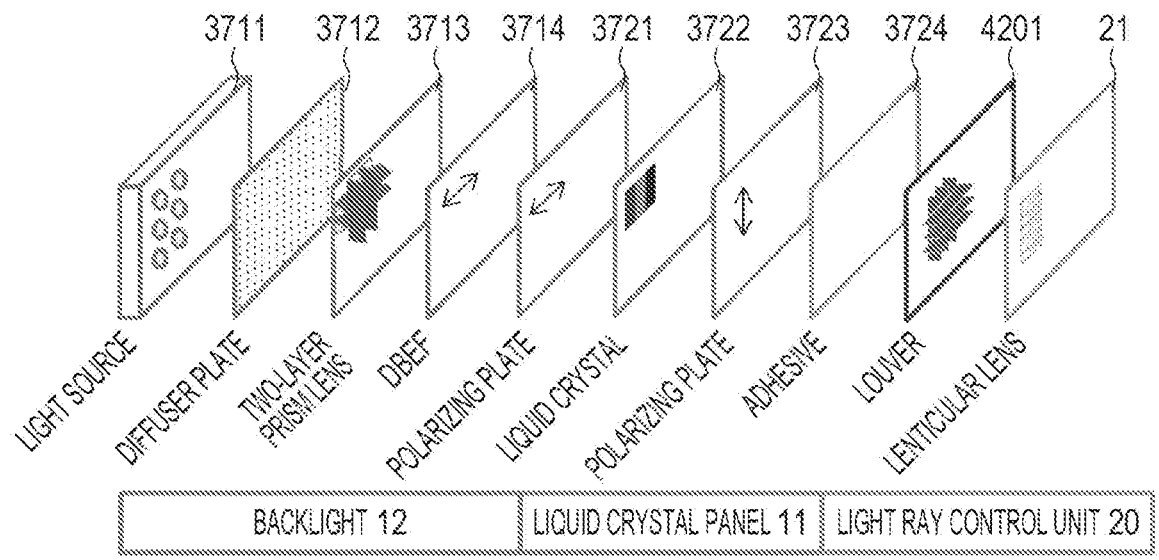
FIG. 42 is a diagram illustrating an exemplary configuration of the light source unit 10 and the lenticular lens 21 with a louver layer arranged in the vicinity of the lenticular lens 21.

FIG. 42 is a diagram illustrating an exemplary configuration of the light source unit 10 and the lenticular lens 21 with a louver layer arranged in the vicinity of the lenticular lens 21.

A louver layer 4201 can be disposed at any position between the front polarizing plate 3723 and the lenticular lens 21. However, if the louver layer 4201 is disposed immediately adjacent to the lenticular lens 21 as illustrated in the drawing, the effect of limiting the incident angle is large. Further, an adhesive 3724 may be provided on the front or back of the louver layer 4201. If one louver layer is inserted, the directivity in either the x or y direction can be controlled. If louvers are arranged in a cross shape so that two louver layers are inserted, the directivity in all directions can be controlled, but the transmittance decreases and the illumination light is darkened.

Figure 43:
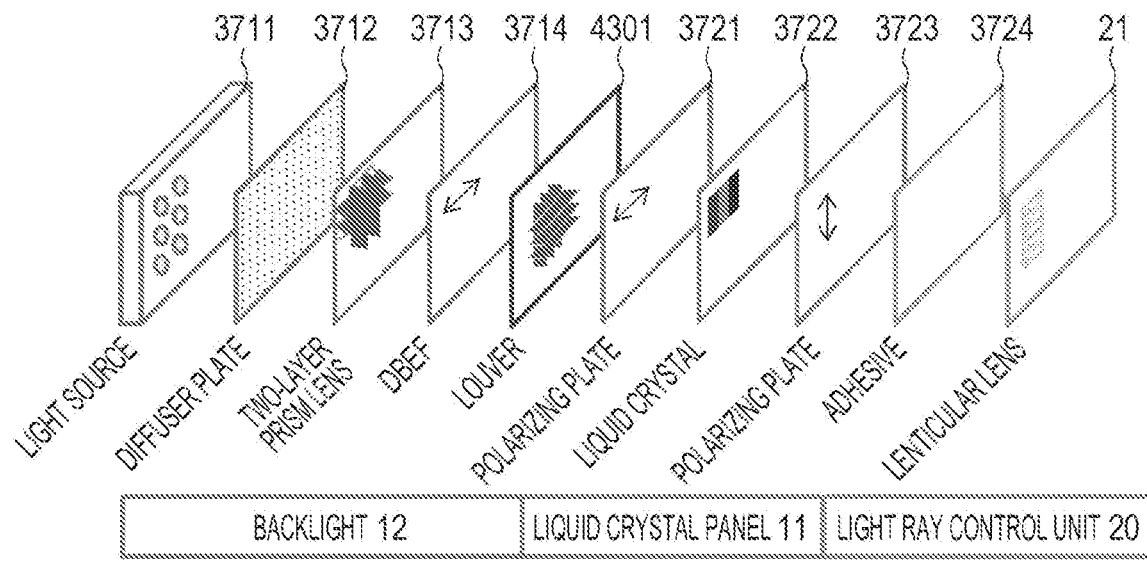
FIG. 43 is a diagram illustrating an exemplary configuration of the light source unit 10 and the lenticular lens 21 with a louver layer arranged in the vicinity of a backlight 12.

In addition, FIG. 43 is a diagram illustrating an exemplary configuration of the light source unit 10 and the lenticular lens 21 with a louver layer arranged in the vicinity of the backlight 12.

A louver layer 4301 can be disposed at any position between the back polarizing plate 3721 and the light source 3711. However, if the louver layer 4301 is disposed immediately adjacent to the back polarizing plate 3721 as illustrated in the drawing, the effect of limiting the incident angle is large. If one louver layer is inserted, the directivity in either the x or y direction can be controlled. If louvers are arranged in a cross shape so that two louver layers are inserted, the directivity in all directions can be controlled, but the transmittance decreases and the illumination light is darkened.

FIG. 15 is a diagram illustrating how light like a spotlight is reproduced by radiating light only in the front direction in a certain region of the lighting device 100 using the lenticular lens 21 (refer to FIG. 12) in which the problem of crosstalk has been resolved. Since the partition 1201 is provided on the side surface of each lenticule, radiation light from the pixel below a lenticule does not enter the adjacent lenticule (refer to FIG. 11), so that the spotlight effect can be obtained.

D. Application Example of Lighting Device

The lighting device 100 according to the present embodiment can be installed for use on the ceiling of a room, for example. In addition, the installation location is not limited to the ceiling, but may be the wall surface or floor of a room.

For example, in a case where the lighting device 100 is installed on the ceiling of a room, it may be installed near the wall, not in the center of the ceiling. In a case where the lighting device 100 is installed near the wall, the lighting device 100 can be configured to irradiate the inside of the room (refer to FIG. 28) or illuminate the wall to realize indirect illumination (refer to FIG. 31) by changing the shape of the lenticular lens to be used.

In addition, in a case where the lighting device 100 is used in a space like an elongated corridor, by changing the shape of the lenticular lens to be used (refer to FIG. 33), it is possible to make the emission angle narrow in the x direction in which the distance between the walls is short and make the emission angle wide in the y direction in which the distance between the walls is long so as to brighten the entire space efficiently (refer to FIG. 32).

Figure 16:
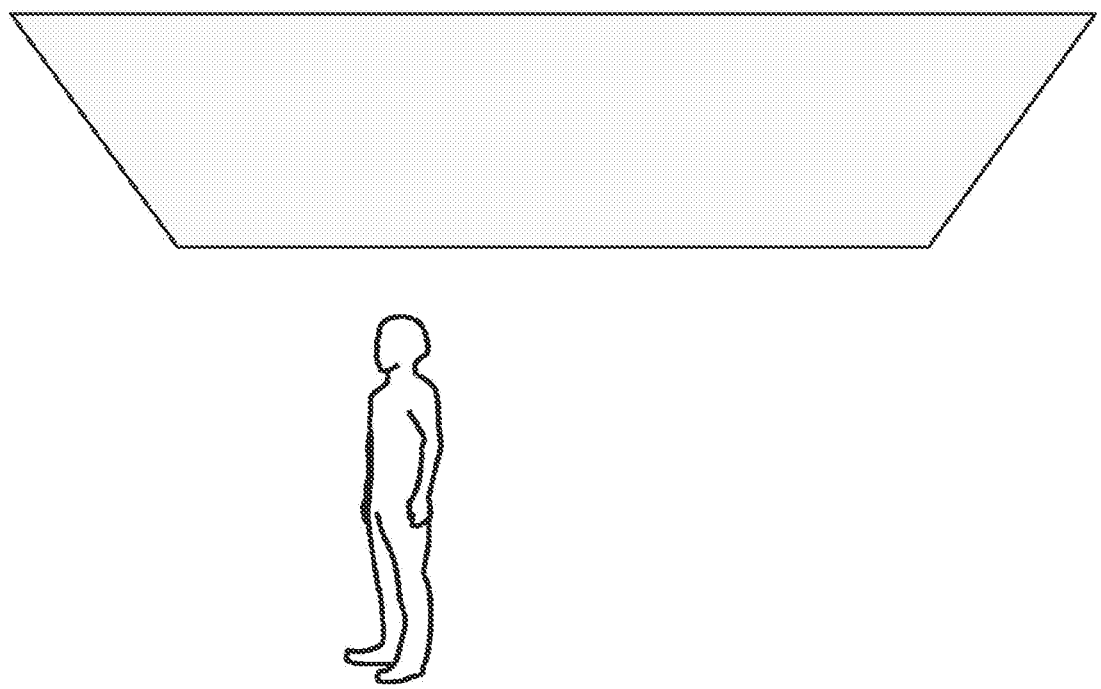
FIG. 16 is a diagram illustrating an example in which a light source (with a different color) is reproduced by the lighting device 100.
Figure 17:
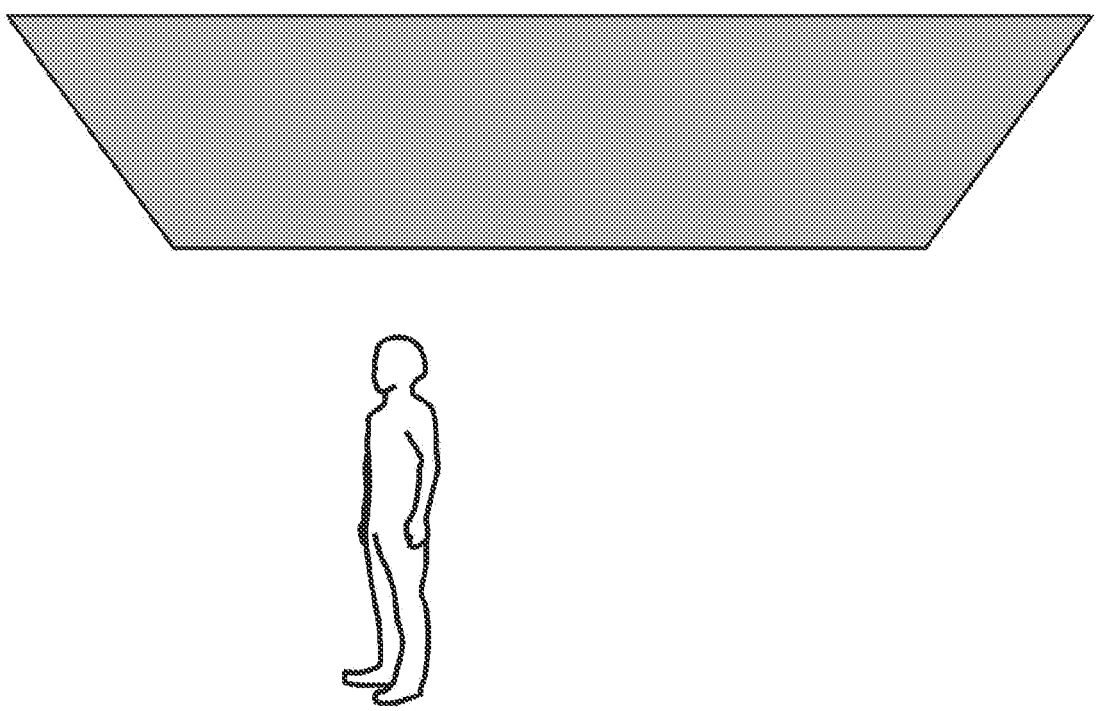
FIG. 17 is a diagram illustrating an example in which a light source (with a different color) is reproduced by the lighting device 100.

In addition, the lighting device 100 according to the present embodiment can be installed on the ceiling of a room to change the color of light as illustrated in FIGS. 16 to 18.

Figure 20:
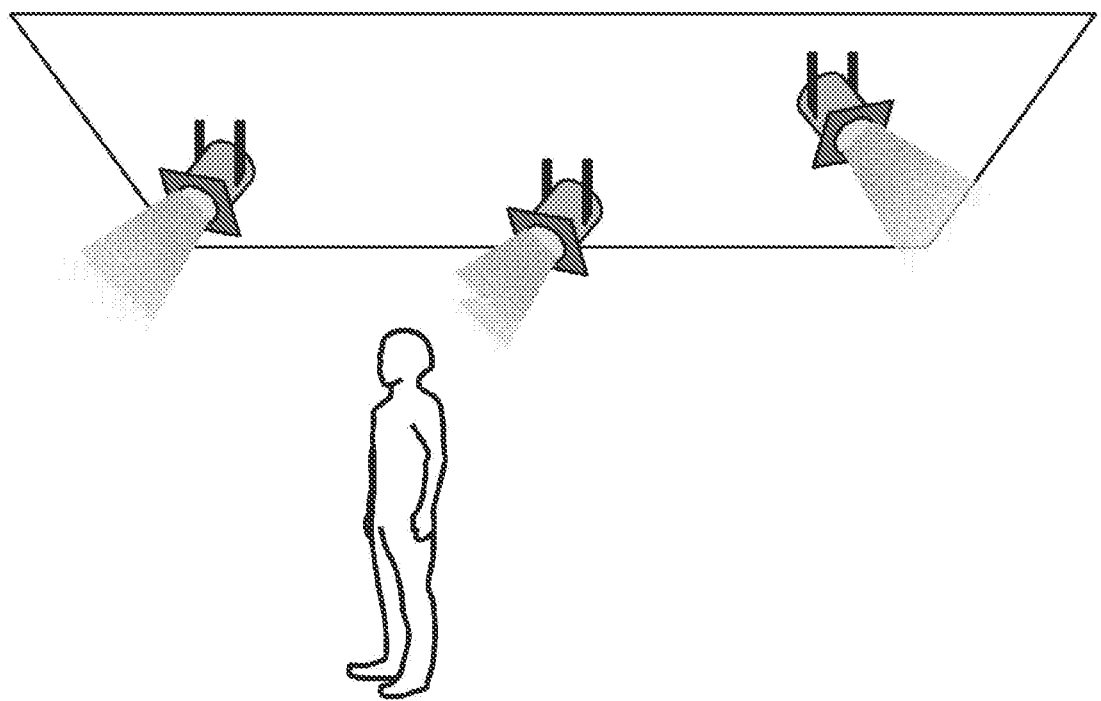
FIG. 20 is a diagram illustrating an example in which light sources (a plurality of spotlights) are reproduced by the lighting device 100.

In addition, the lighting device 100 according to the present embodiment can be installed on the ceiling of a room to reproduce the light of one spotlight as illustrated in FIG. 19. Further, as illustrated in FIG. 20, it is also possible to reproduce the beams of light of a plurality of spotlights.

Figure 21:
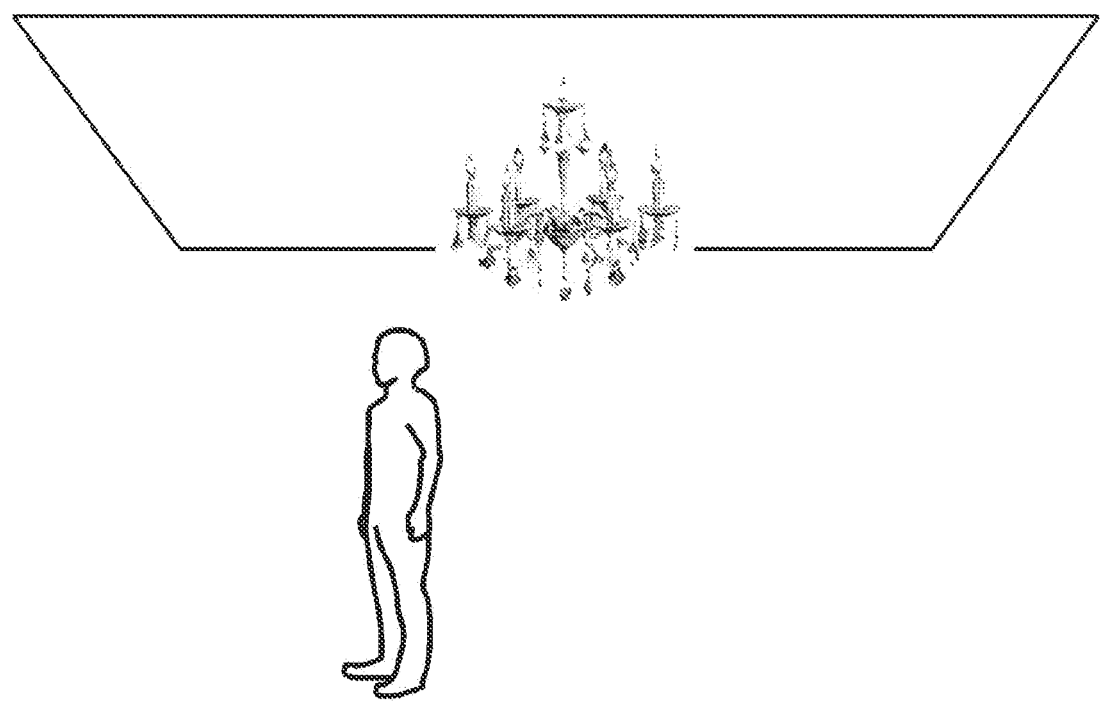
FIG. 21 is a diagram illustrating an example in which a light source (light from a decorative lighting fixture such as a chandelier) is reproduced by the lighting device 100.

In addition, the lighting device 100 according to the present embodiment can be installed on the ceiling of a room to reproduce the light of a decorative lighting fixture such as a chandelier as illustrated in FIG. 21.

In addition, the lighting device 100 according to the present embodiment can be installed on the ceiling of a room to reproduce natural light such as light filtering through trees as illustrated in FIG. 22 or twilight rays leaking from breaks in clouds as illustrated in FIG. 23.

As described above, the lighting device 100 according to the present embodiment can adjust various other parameters such as the positions and number of light sources and how the light spreads by combining the light source unit 10 and the lenticular lens 21 (as described above), and can more realistically reproduce a wide range of light sources including real light sources (e.g., natural light such as sunlight) and imaginary light sources (e.g., a spotlight, a chandelier, and the like). In this industry, technology for highly reproducing various light sources is also referred to as integral imaging, programmable lighting, and integral illumination.

A processing procedure for the lighting device 100 to reproduce various light sources will be described.

Information regarding the light source to be reproduced by the lighting device 100 is input through the UI unit 40.

On the basis of a technique such as ray tracing, the light emission control unit 32 calculates the direction, hue, and intensity of light that is emitted from each lenticule of the lenticular lens 21 for forming the desired light source.

Then, the light emission control unit 32 calculates a control signal for the liquid crystal panel 11 below the lenticules for realizing the direction, hue, and intensity of light that is emitted from each lenticule, and controls driving of the liquid crystal panel 11 on the basis of this control signal.

E. Modification of Lighting Device

In FIG. 2 and the like, exemplary configurations and application examples of the lighting device 100 with the use of the light source unit 10 including a combination of the liquid crystal panel 11 and the backlight 12 have been described. As a modification, instead of using the backlight 12, natural light such as sunlight may be used as a light source so that the hue, intensity, and distribution of the natural light taken into the room are controlled by the liquid crystal panel 11 and the light ray control unit 20 such as the lenticular lens.

Figure 44:
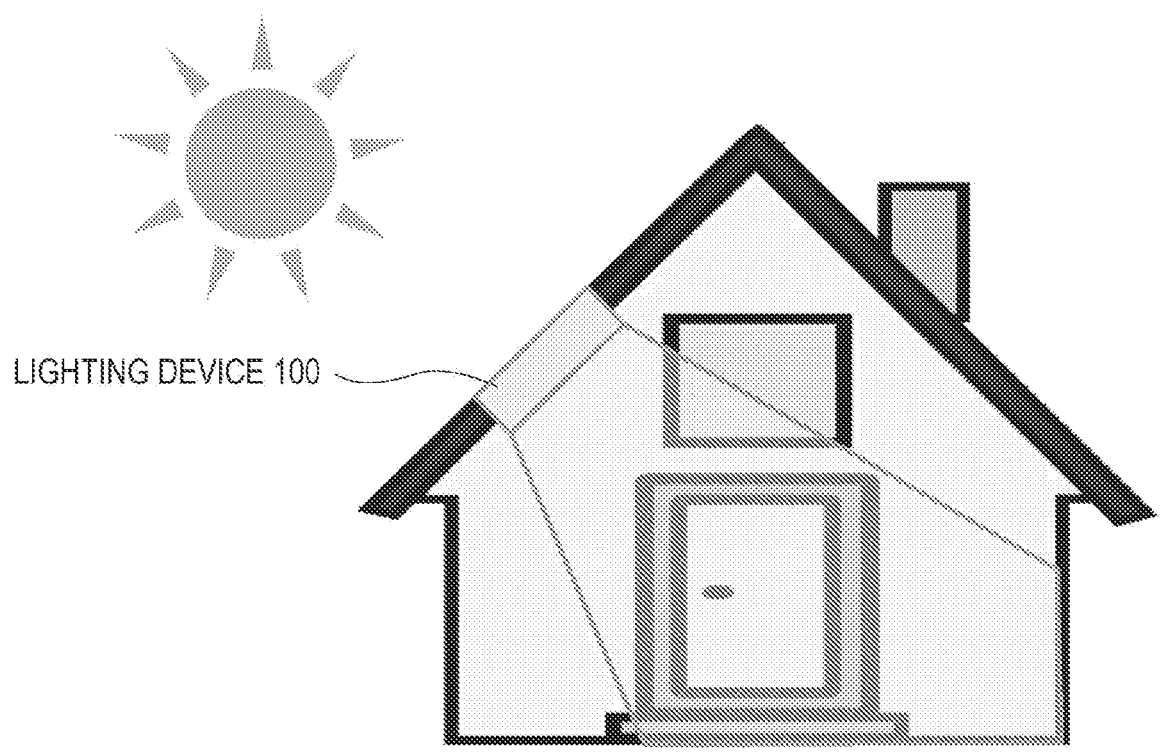
FIG. 44 is a diagram illustrating how the lighting device 100 using natural light as a light source is installed indoors like a skylight.

FIG. 44 is a diagram illustrating how (the light ray control unit 20 and the light source unit 10 of) the lighting device 100 using natural light as a light source is installed indoors like a skylight. In FIG. 44, the lighting device 100 is depicted in a simplified manner, but it is assumed that the light ray control unit 20 is arranged on the surface facing the room, and the liquid crystal panel 11 is arranged outside the light ray control unit 20.

Normally, external light including natural light such as sunlight and moonlight and artificial light such as a street light irradiates the room through the skylight. On the other hand, in the case of the lighting device 100 illustrated in FIG. 44, shutter operation by the liquid crystal panel 11 enables the hue and intensity of the external light irradiating the room to be controlled, and the distribution of light can be controlled by the light ray control unit 20. For example, the distribution of light can be electrically and dynamically switched by using liquid crystal lenses for the light ray control unit 20. Note that in the state illustrated in FIG. 44, the light ray control unit 20 does not change the distribution of light but takes sunlight as it is in the room.

Figure 45:
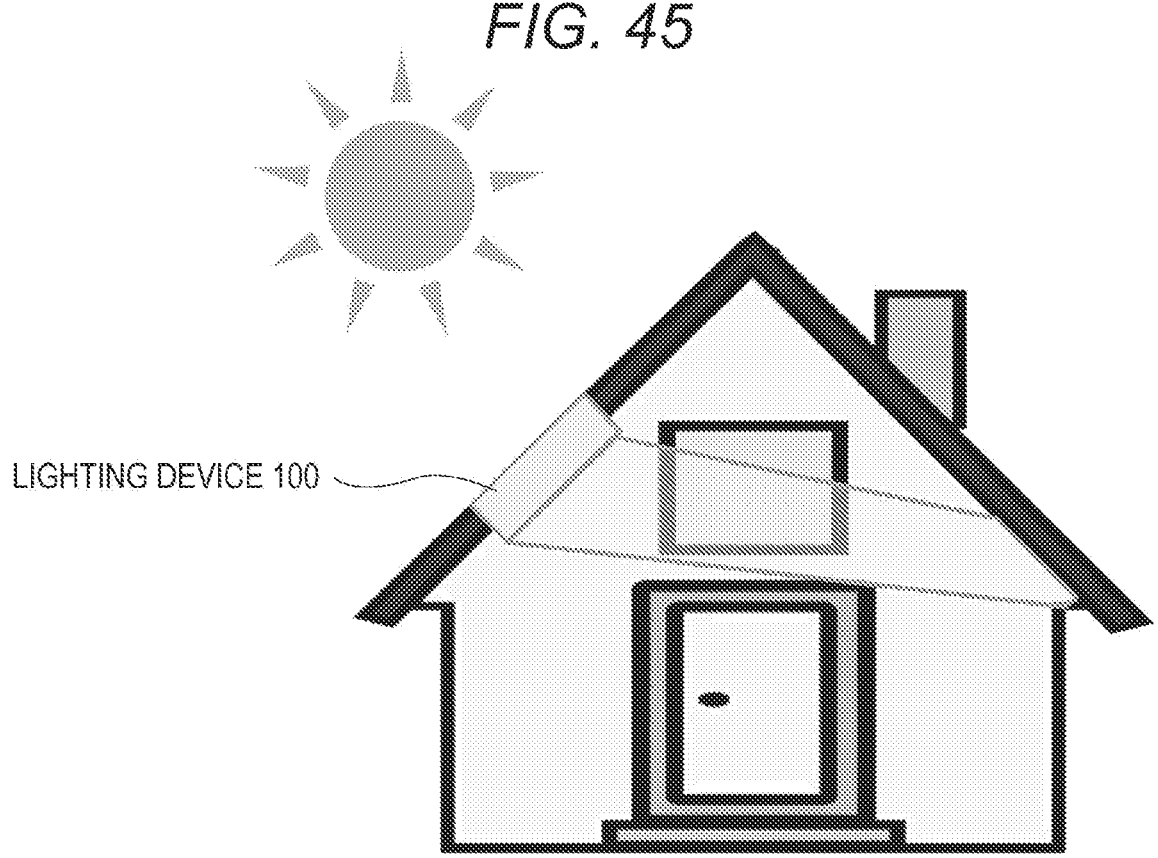
FIG. 45 is a diagram illustrating an application example of the lighting device 100 using natural light as a light source.
Figure 46:
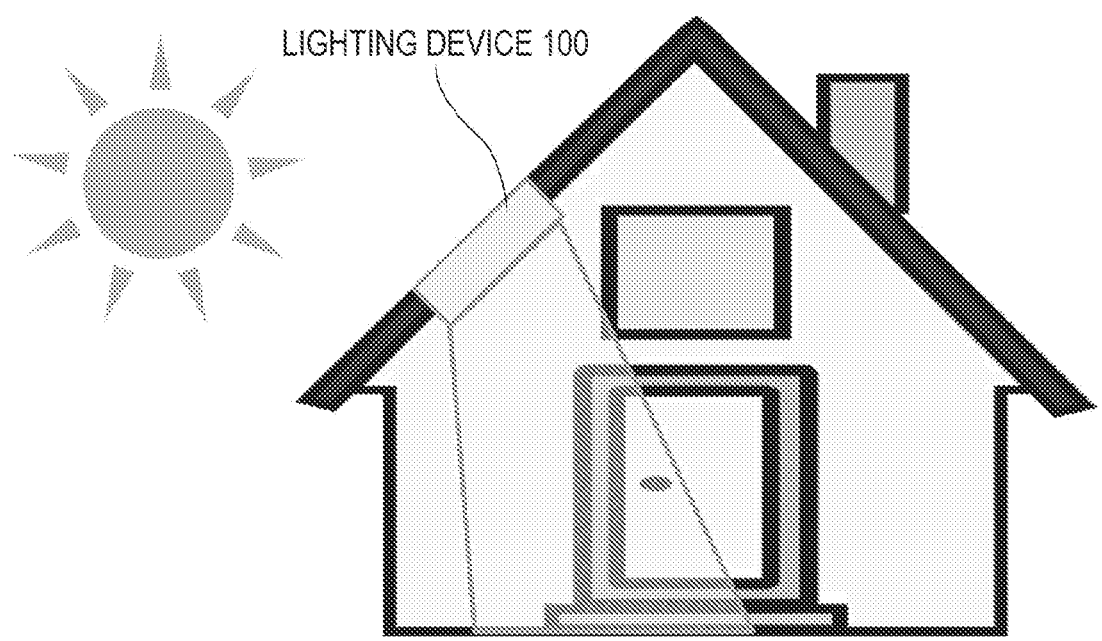
FIG. 46 is a diagram illustrating an application example of the lighting device 100 using natural light as a light source.

For example, in hot summer days or the like, as illustrated in FIG. 45, the distribution of light may be switched such that sunlight does not irradiate the floor surface but irradiates the wall or ceiling, so that the lighting device 100 can be used as indirect illumination. Conversely, in the winter or the like when little sunlight is available, as illustrated in FIG. 46, the distribution of light can be switched such that sunlight directly irradiates the floor surface, so that the room can be warmed.

INDUSTRIAL APPLICABILITY

The technology disclosed in the present description has been described in detail so far with reference to the specific embodiment. However, it is obvious that a person skilled in the art can modify or replace the embodiment in a range not deviating from the gist of the technology disclosed in the present description.

The lighting device to which the technology disclosed in the present description is applied can be installed for use on the ceiling, wall surface, floor, or the like of a room, for example. The lighting device to which the technology disclosed in the present description is applied can not only simply adjust the hue and intensity but also control light rays, and can realistically reproduce various light sources such as artificial light of lighting fixtures including a spot light and a chandelier and natural light including light filtering through trees and twilight rays.

To sum up, the technology disclosed in the present description has been described by an exemplary embodiment, and the contents of the present description should not be interpreted restrictively. The scope of the claims should be referred to for determining the gist of the technology disclosed in the present description.

Note that the technology disclosed in the present description can also be configured as follows.

(1) A lighting device including:
a light source unit including a two-dimensional array of light sources capable of adjusting hue and intensity; and
a light ray control unit configured to control a radiation direction of the light source capable of adjusting hue and intensity.
(2) The lighting device according to (1), in which
the light ray control unit includes a lenticular lens arranged such that a plurality of
the light sources capable of adjusting hue and intensity is associated with each lenticule.
(3) The lighting device according to claim 2, in which
the lenticular lens has a radiation direction inclined from a front direction.
(3-1) The lighting device according to (3), in which
the lenticular lens includes lenticules inclined in a predetermined direction.
(3-2) The lighting device according to (3), in which
the lenticular lens includes lenticules having lenses deviated from the center.
(4) The lighting device according to claim 2, in which
the lenticular lens has different emission angles for respective directions.
(4-1) The lighting device according to (4), in which
the lenticular lens includes lenticules formed by cutting off only a central portion in one direction.
(5) The lighting device according to (2), in which
the light source unit includes a liquid crystal panel and a light source configured to irradiate the liquid crystal panel from behind.
(6) The lighting device according to (5), in which
the light source unit further includes a louver configured to limit an incident angle of incident light on the lenticular lens to a predetermined value or less.
(6-1) The lighting device according to (6), in which
the louver is installed near the lenticular lens.
(6-2) The lighting device according to (6), in which
the louver is installed near the back surface of the liquid crystal panel.
(7) The lighting device according to (1), in which
the light source unit includes a light emitting diode element.
(8) The lighting device according to (1), in which
the light source unit includes an organic EL element.
(9) The lighting device according to (2), in which each lenticule of the lenticular lens includes an opaque portion on a side surface.
(10) The lighting device according to (9), in which
the opaque portion blocks light from the light source capable of adjusting hue and intensity associated with an adjacent lenticule.
(11) The lighting device according to (1), in which
lenticules of the lenticular lens are arranged apart from one another.
(12) The lighting device according to (1), further including
a control unit configured to control driving of the light source unit.
(13) A lenticular lens including lenticules with opaque portions formed on respective side surfaces.

REFERENCE SIGNS LIST

100 Lighting device
10 Light source unit
11 Liquid crystal panel
12 Backlight
20 Light ray control unit
21 Lenticular lens
30 Control unit
31 Instruction receiving unit
32 Light emission control unit
40 User interface unit
3711 Light source
3712 Diffuser plate
3713 Prism lens
3714 Reflective polarizing film
3721 Polarizing plate (back side)

3722 Liquid crystal
3723 Polarizing plate (front side)
3724 Adhesive
4201, 4301 Louver layer

What is claimed is:

1. A lighting device, comprising:
a light source unit that includes a plurality of light sources in a two-dimensional array; and
a light ray control unit configured to control a respective radiation direction of each light source of the plurality of light sources, wherein
the light ray control unit includes a lenticular lens,
the lenticular lens includes a plurality of lenticules,
each lenticule of the plurality of lenticules comprises a cylindrical portion and a convex lens on an upper surface of the cylindrical portion,
the convex lens has a convex surface that faces away from the light source unit,
a side surface of the cylindrical portion comprises an opaque portion, and
the convex surface of the convex lens of a specific lenticule of the plurality of lenticules is deviated from a center of the specific lenticule.

2. The lighting device according to claim 1, wherein the light source unit further includes a louver configured to limit an incident angle of light incident on the lenticular lens.

3. The lighting device according to claim 1, wherein
the opaque portion of a first lenticule of the plurality of lenticules is configured to block light incident on the lenticular lens from a set of light sources of the plurality of light sources,
the set of light sources is associated with a second lenticule of the plurality of lenticules, and
the second lenticule is adjacent to the first lenticule.

4. The lighting device according to claim 1, wherein each lenticule of the plurality of lenticules is associated with a respective set of light sources of the plurality of light sources.

5. The lighting device according to claim 1, wherein a radiation direction of the lenticular lens is at an inclination from a front direction of the lighting device.

6. The lighting device according to claim 1, wherein the lenticular lens has respective emission angles for different directions of the plurality of light sources.

7. The lighting device according to claim 1, wherein a gap is between two adjacent lenticules of the plurality of lenticules.

8. The lighting device according to claim 1, wherein an arrangement of the plurality of lenticules is shifted by a half pitch for each row of the plurality of lenticules such that centers of adjacent lenticules of the plurality of lenticules form a triangular shape in plan view.

9. The lighting device according to claim 1, wherein the convex surface of the convex lens of each lenticule of the plurality of lenticules is deviated from the center of a respective lenticule in a same direction relative to other lenticules of the plurality of lenticules.

10. A lenticular lens, comprising:
a plurality of lenticules, wherein
each lenticule of the plurality of lenticules comprises a cylindrical portion and a convex lens on an upper surface of the cylindrical portion,
the convex lens has a convex surface that faces away from a plurality of light sources,
a side surface of the cylindrical portion comprises an opaque portion,
the convex surface of the convex lens of a specific lenticule of the plurality of lenticules is deviated a center of the specific lenticule, and
each lenticule of the plurality of lenticules is configured to control light emitted from a corresponding set of light sources of the plurality of light sources.

11. The lenticular lens according to claim 10, wherein
the opaque portion of a first lenticule of the plurality of lenticules is configured to block light incident on the lenticular lens from a specific set of light sources of the plurality of light sources,
the specific set of light sources is associated with a second lenticule of the plurality of lenticules, and
the second lenticule is adjacent to the first lenticule.

12. The lenticular lens according to claim 10, wherein an emission angle of the light from each lenticule is based on a height of a corresponding lenticule of the plurality of lenticules, a curvature of the corresponding lenticule, and a refractive index of a material of the corresponding lenticule, and a position of the corresponding lenticule relative to pixels of the corresponding set of light sources.

* * * * *